United States Patent
Allison

(10) Patent No.: US 7,028,289 B2
(45) Date of Patent: Apr. 11, 2006

(54) STREAM OPERATOR IN A DYNAMICALLY TYPED PROGRAMMING LANGUAGE

(75) Inventor: David S. Allison, San Ramon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 809 days.

(21) Appl. No.: 09/977,507

(22) Filed: Oct. 12, 2001

(65) Prior Publication Data

US 2003/0093592 A1 May 15, 2003

(51) Int. Cl.
*G06F 9/44* (2006.01)

(52) U.S. Cl. ........................................ 717/114; 717/159

(58) Field of Classification Search ................. 717/114, 717/159
See application file for complete search history.

(56) References Cited

U.S. PATENT DOCUMENTS

| 5,450,600 | A | * | 9/1995 | Abe | ........................... | 717/114 |
| 5,598,560 | A | * | 1/1997 | Benson | ........................ | 717/159 |
| 6,134,707 | A | * | 10/2000 | Herrmann et al. | .......... | 717/139 |
| 6,138,273 | A | * | 10/2000 | Sturges | ........................ | 717/114 |

OTHER PUBLICATIONS

Microsoft GW–BASIC Interpreter User's Guide, Microsoft Corporation, 1988, pp. 10–16, 38–45, 51–55, 61–70, 91–98.*

Using Basic, Rich Didday, West Publishing, 1981, pp. 416–420.*

Fast Power Estimation For Determinstic Input Streams, Luca Benini et al, IEEE, 1997, pp. 494–501.*

Efficient Power Estimation for Highly Correlated Input Streams, Radu Marculescu et al, ACM, 1995, 7 pages.*

UIO: A Uniform I/O System Interface for Distributed Systems, David R. Cheriton Stanford University, ACM, vol. 5, No 1, Feb. 1987, pp. 12–46.*

Testing and Spot–Checking of Data Streams, J. Feigenbaum et al, ACM, 1997, pp. 165–174.*

The Multics Input/Output System, R.J. Feirtag, MIT, ACM 1971, pp. 35–41.*

Optimal Smoothing Schedules for Real–Time Streams, Yishay Mansour et al, ACM, 2000, pp. 21–29.*

* cited by examiner

*Primary Examiner*—Todd Ingberg
(74) *Attorney, Agent, or Firm*—Osha Liang LLP

(57) ABSTRACT

The present invention provides a method and apparatus for implementation of an input/output stream operator in a dynamically typed language. This operator is built into the language, and allows a value of one type to be streamed to a value of another type by taking the form fromvalue→tovalue. Since the programming language is dynamic, the type of values on either side of the → operator is of any supported type, and can be modified depending upon the type of operands. For example, a value of any type can be streamed to a value of type "stream". In this instance, the destination value is attached to, for example, a device such as a terminal or disk drive. A value of type "stream" can also be streamed into a value of any type. In this instance an external source is inputted, for example, into a program.

16 Claims, 16 Drawing Sheets

FIGURE 6A

| Function | Purpose |
| --- | --- |
| openin (filename) | Open the named file for input |
| openout (filename) | Open the named file for output |
| openup (filename) | Open the names file for update (reading and writing) |
| openfd (fd) | Open the integer file descriptor as a stream |
| open (filename, mode) | Open the named file with the given integer mode |

FIGURE 6B

| Function | Meaning |
| --- | --- |
| Network.open (addr,port) | Open an active network connection (TCP) |
| Network.openServer (addr, port, type) | Open a passive network connection (TCP or UDP |
| Network.lookupName (name) | Consult a naming service to convert a network name to an address |
| Network.lookupAddress (ipaddr) | Consult a naming service to convert an integer IP address into a host name |
| Network.accept() | Wait for and accept an incoming connection |
| Network.openSocket() | Open a UDP client socket for sending datagrams |
| Network.send (socket, addr, port, buffer) | Send a UDP datagram to the given socket. The addr and port specify the recipient. The buffer is the string to send |
| Network.receive (socket, var addr, var port, maxbuffer = 4096) | Wait for an incoming UDP datagram. Blocks until a datagram is received, then returns the data as a string. Also sets the addr and port to the sending address. The maxbuffer argument specifies the max size of data that can be received |
| Network.peek (socket, var addr, var port, maxbuffer = 4096) | As receive, but don't extract the data from the network. A call to receive() will read the data. |
| Network.formatIPAddress (addr) | Build a string of the form n.n.n.n out of an integer IP address. |

FIGURE 7

| Data type | Reading | Writing |
|---|---|---|
| integer | Decimal integer converted to binary | Decimal integer |
| string | Whole line read – terminated by line feed character which is discarded | Characters written to stream. |
| real | ASCII for real value | Written as ASCII |
| char | Single character | Single character |
| vector | Each line of file appended to vector – line feed is retained | Each element written |
| map | cannot read | Elements written as first = second |
| enumeration constant | cannot read | Name of enumeration constant |

FIGURE 8

| Operation | Result |
|---|---|
| close (stream) | The stream is closed. |
| select (stream, timeout) | Returns 1 if there is data waiting to be read from stream. Times out after timeout microseconds. |
| eof (stream) | Returns 1 if the stream is at the end of file. |
| flush (stream) | Flush the data remaining in the stream buffers. |
| getchar (stream) | Read a single character from the stream. Returns the character read. |
| getbuffer (stream) | Read all the available characters in the stream buffer. Returns a string containing all the characters. |
| availableChars (stream) | Returns the number of characters in the buffer. |
| setStreamAttribute (stream, attr, value) | Set the value of a stream attribute. |
| rewind (stream) | Rewind the stream to the start. |
| seek (stream, offset, whence) | Move to a new position in a seekable stream. |

FIGURE 9 – Page 1

| Output type | Input type | Operation |
|---|---|---|
| integer | integer | copy left to right |
| | real | real converted to integer |
| | string | string converted to integer if possible, 0 otherwise |
| | vector | first element converted to integer |
| | map | first element converted to integer |
| | char | converted to integer |
| | block | integer set to address |
| | enumconst | index into enumeration |
| | object | call toInteger( ) if present, otherwise address of object |
| | stream | one integer read from stream |
| real | integer | converted to real |
| | real | copied |
| | string | string converted to real if possible, 0.0 otherwise |
| | vector | first element converted to real |
| | map | first element converted to real |
| | char | converted to integer then real |
| | block | converted to integer then real |
| | enumconst | converted to integer then real |
| | object | toReal( ) called if present, error otherwise |
| | stream | one floating point number read from stream |
| string | integer | converted to string |
| | real | converted to string |
| | string | copied |
| | vector | each element appended to string |
| | map | each element appended to string |
| | char | converted to string |
| | block | name of block |
| | enumconst | name of constant |
| | object | toString( ) called if present, blockname@address if not |
| | stream | one line read from stream |
| char | integer | truncated to 8 bits |
| | real | runtime error |
| | string | first character in string |
| | vector | first element converted to char |
| | map | first element converted to char |
| | block | first character of name |
| | enumconst | 'A' = first const, 'B' = second, etc |
| | object | toChar( ) called if present, error if not |
| | stream | one char read from stream |

FIGURE 9 – Page 2

| Output type | Input type | Operation |
|---|---|---|
| vector | object | toVector( ) called if present, otherwise object appended to vector |
|  | anything | appended to vector |
| map | object | toMap( ) called if present, otherwise appended |
|  | anything | appended as {x = x} |
| function | scalar | function called with single argument |
|  | vector | function called once for each element. Element passed as parameter |
|  | map | function called for each element. Function has to arguments for left and right of map pair. |
|  | stream | function called for each line of input |
| thread |  | like function |
| class |  | like function only new object created for each |
| package |  | like class |
| enum |  | runtime error |
| enumconst |  | runtime error |
| object |  | runtime error |
| stream | integer | converted to decimal character sequence |
|  | real | converted to floating point character sequence |
|  | string | each character written |
|  | char | single character written |
|  | vector | each element written |
|  | map | each element written as left = right |
|  | block | block name written |
|  | enumconst | name of constant written |
|  | object | "object " + address written |
|  | stream | steam copied |

STREAM OPERATOR IN A DYNAMICALLY TYPED PROGRAMMING LANGUAGE

BACKGROUND OF THE INVENTION

1. Field of the Invention

The present invention relates primarily to the field of dynamically typed programming languages, and in particular to a method and apparatus for implementation of an input/output (I/O) stream operator in a dynamically typed programming language.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Prior art programming languages, especially object-oriented languages like C, C++, and JAVA, to name a few, have an I/O facility that has to be imported (streamed) via special libraries. The I/O character is not built into the language, but is part of a stream operator, which is part of the special library, that allows the contents of one value to be copied to another.

Since the library includes other operators and functions, it constitutes unnecessarily huge overhead, especially if only a few of the operators and functions are used by the program. This overhead may make a program bulky to transport since the overall size of the program increases because of this overhead. Furthermore, this overhead may make a program slow to run because the program has to access the stream operator in the special library whenever it needs certain tasks like accepting user input, or displaying program output.

Streams

Streams are channels attached to an I/O port, and used for sending or receiving data. Streams may be attached to a file, screen, keyboard, network, or similar I/O devices. Standard streams, for example, stdin, stdout, and stderr, are provided for standard file descriptors available to all programs. Streams get created when a file is opened, or a network connection is made. In prior art object-oriented languages, there is a vast set of library functions available to manipulate streams.

For example, in C, a programmer has two options of storing in a variable the results of a computation. The first is by way of an assignment operation using the symbol =. The syntax for using the assignment operator is: result= expression, where the variable specified by result is assigned the value of expression. The previous value of result is destroyed. The expression can be a single variable, a single constant, or it may involve variables, constants, and arithmetic operators like +, −, *, and /. Even though the first option of using an assignment operation is powerful and used often, the user can only store the results of locally found variables and constants.

FIG. 1 illustrates the storing of a result in a variable using the first method explained above. At block 100, a result needs to be stored in a variable. At block 110, the =symbol is used to store the results. At block 120, if the expression is a single variable, then at block 130 the expression is stored in result using result=expression. At block 140, the previous value of result is lost forever. In other words, the old value of result is written over.

If at block 120, the expression is not a single variable, then at block 150 a check is made to see if the expression is a single constant. If it is, then blocks 130 and 140 are repeated. If on the other hand block 150 reveals that the expression is not a single constant, then at block 160 a check is made to see if the expression is multiple variables or constants. If it is, then blocks 130 and 140 are repeated. If on the other hand block 160 reveals that the expression is not a multiple variable or constant, then at block 170 a check is made to see if the expression involves arithmetic operators like +, −, *, or /. If it is, then blocks 130 and 140 are repeated.

If the user wants to store the results to, for example a computer monitor, or from an external source, for example a file, or wants the program to manipulate different data each time the program executes, then a second option where a function, for example, scanf in the object-oriented programming language C is used. This data transfer from the outside world into memory is called an input operation. Similarly, as a program executes, it performs computations and assigns new values to variables whose results can be displayed to the program user by an output operation using a function, for example, printf in the object oriented programming language C is used. This data transfer to the outside world from memory is called an output operation.

FIG. 2 illustrates the second option to store results to or from an external source. At block 200, if the result is to be stored from an external source, then at block 210 a function is used to transfer the data/result from the external source. If not, then a check is made at block 220 to see if different data/result needs to be manipulated. If different data/result needs to be manipulated, then block 210 is repeated. If not, then a check is made at block 230 to see if the data/result needs to be displayed to a user. If the data/result needs to be displayed, then a function is used at block 240 to display data/result to a user. If not, then the next data/result is checked at block 250, after which block 200 is repeated again.

All I/O operations, for example, in C are performed by executing special program units called I/O functions. The most common I/O functions are supplied in the C standard I/O library to which a user gains access through the use of a preprocessor directive, for example, #include<stdio.h>. The #include directives tell the preprocessor where to find the meanings of standard identifiers used in a program. These meanings are collected in files called standard header files. The header file stdio.h (the h extension defines the file as a header file) contains information about standard input and output functions such as scanf and printf.

In order to import from or write to an external source, the language offers only one solution, which is to include a library of functions. This could result in a large overhead, especially because a library contains many functions of which only a few may be used to run a program.

Similarly, in C++, a programmer has to import (or include the contents of) a header file called the iostream.h file in order to perform any I/O operations. This header file has an istream class which contain objects like cin and an ostream class which contain objects like cout. This header file is necessary to compile programs that use cin and cout. The cin object reads from standard input (keyboard, redirected file, or some similar input source), where the >> operator (also called the stream-extraction) is used for reading data. Similarly, the cout object writes to standard output (computer screen, redirected file, or some similar output source), where the << operator (also called the stream-insertion) is used for writing data.

For example, a C++ partial program is shown below to illustrate the point.

```
#include <iostream.h>    // This preprocessor directive is the header file that has to
                         // be imported from a C++ library.
double x;      // x is 8 bytes in the rough range of ±1.7976...E+308 (15 significant
               // digits).
String s;      // s is a sequence of characters.
cin >> s >> x;           // Input two values - one for s and another for x.
cout << "s is" << s << ", and the value of x is" << x; // Output the value of s and x.
```

Here cin is the istream object attached to standard input, where the >> operator is overloaded to take an istream on the left and another type on the right. The foregoing program uses: istream :: operator >> (const char [ ])
There are other >> operators to input other data types. For example:

int x=4;

cin>>x;

These use: istream :: operator >> (int)

Similarly, cout is the ostream object attached to standard output. The << operator is overloaded to take an ostream on the left and another type on the right. The foregoing program uses: ostream :: operator << (const char [ ])

Just like the istream operator, there are other << operators to output other data types. For example:

int x=5;

cout<<x;

These use: ostream:: operator << (int)

Both the stream-extraction operation (>>), and the stream-insertion operation (<<) are smart enough to know the type of data. Assuming above that x has been properly declared, no additional type information is needed.

The iostream library contains many classes for handling a wide variety of I/O operations, and include the istream class which supports stream-input operations, while the ostream class supports stream-output operations. The iostream class supports both stream-input and output operations. The iostream library also contains other objects like cerr, which is the unbuffered standard error stream, and clog, which is the buffered standard error stream. The istream and ostream classes are each derived through a single inheritance from the ios base class. The iostream class is derived through multiple inheritance from both the istream class and the ostream classes. These inheritance relationships are seen in FIG. 4A. The file processing uses the class ifstream to perform file input operations, ofstream for file output operations, and fstream for file input/output operations. Inheritance relationships between the various file processing classes are seen in FIG. 4B. Here the fstream class is derived through inheritance from the iostream class, which is derived through multiple inheritance from both the istream and ostream classes.

There are many more classes in the full stream-I/O class hierarchy supported at most installations, but the classes mentioned above provide the vast majority of needs of most programmers. Even with the few classes mentioned above, the size of this library is huge. By having to import the entire library in order to carry out any I/O operations is a big overhead, since not all operations of the I/O classes are needed for a program to run successfully.

Similarly, in JAVA, a programmer has to import a library called the java.io.* package (the .* means all files and folders under the io branch) in order to carry out any I/O operations. The reason all files and folders have to be chosen is because this package includes 8 interfaces, over 40 stream classes (excluding deprecated classes), and 16 exception classes, with an additional of 10 stream classes in the java.util.zip and java.util.jar packages, and the programmer does not know which of these classes and interfaces will be needed to run the program.

The interfaces include a data input (called DataInput) and data output (called DataOutput) interfaces. The data input interface is implemented by streams that can read primitive Java data types from a stream in a machine-independent manner. Similarly, the data output interface is implemented by streams that can write primitive Java data types to an output stream in a machine-independent manner. The DataInput interface includes about 15 methods including, readBoolean( )—reads a Boolean value from the input stream, and skipBytes(int n)—skips exactly n bytes of input, to name a couple. Similarly, the DataOutput interface includes about 14 methods including, write(byte[ ])—writes b.length bytes from the specified byte array to this output stream, and writeUTF(String)—writes a Unicode string by encoding it using modified UTF-8 format, to name a couple.

The stream classes include one for input (InputStream class) and one for output (OutputStream class), to name a couple. The abstract class InputStream is the superclass of all classes representing an input stream of bytes. Applications that need to define a subclass of InputStream must always provide a method that returns the next byte of input. This superclass includes one constructor method and 9 other methods, including, available( )—returns the number of bytes that can be read from this input stream without blocking, and read( )—reads the next byte of data from this input stream, to name a couple. This superclass is implemented by another class, called the FilterInputStream class, which has a list of methods under it. The FilterInputStream class is extended by another class called the DataInputStream class that has its own list of methods under it. FIG. 5A shows the entire hierarchical tree for the DataInputStream class described above.

Similarly, the abstract class OutputStream is the superclass of all classes representing an output stream of bytes. Applications that need to define a subclass of OutputStream must always provide a method that writes one byte of output. This superclass includes a constructor method and 5 other methods, including, close( )—closes this output stream and releases any stream resources associated with this stream, and write(int)—writes the specified byte to this output stream. This superclass is implemented by another class, called the FilterOutputStream class, which has a list of methods under it. The FilterOutputStream class is extended by another class called the DataOutputStream class that has its own list of methods under it. FIG. 5B shows the entire hierarchical tree for the DataOutputStream class described above.

All of these classes, sub-classes, and accompanying methods are automatically included in the java.io package, and constitute unnecessarily large overhead, especially since a program may only use a handful of these classes, sub-classes, and accompanying methods to run successfully.

SUMMARY OF THE INVENTION

The present invention provides a method and apparatus for implementation of an input/output stream operator in a dynamically typed programming language. According to one embodiment of the present invention, this stream operator is built into the language. According to another embodiment of the present invention, this operator allows a value of one type to be streamed to a value of another type, taking the form from value→to value. Since the programming language is dynamic, the type of values on either side of the→operator is of any supported type, and can be modified depending upon the type of operands.

According to another embodiment of the present invention, a value of any type is streamed to a value of type "stream". The destination value (type stream) is attached to a device, for example, a terminal or disk drive. The type of the right operand of the operator is not limited to the "stream" type, and can be changed to any of the supported types. The behavior of the operator depends on the actual type of the value at runtime. According to another embodiment of the present invention, a value of type "stream" is streamed into a value of any type. In this instance the stream operator is used to input into a program an external input.

BRIEF DESCRIPTION OF THE DRAWINGS

These and other features, aspects and advantages of the present invention will become better understood with regard to the following description, appended claims and accompanying drawings where:

FIG. 6A is a table of file stream functions of the present language.

FIG. 6B is a table of network stream functions of the present language.

FIG. 7 is a table of different data types that can be read and written by the present language.

FIG. 8 is a table of stream operations held in a System package.

FIG. 9 is a table showing the rules for the various built-in types in the present language.

DETAILED DESCRIPTION OF THE INVENTION

The invention relates to a method and apparatus for implementation of an input/output stream operator in a dynamically typed programming language. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Streams

Unlike prior art object-oriented programming languages like C++ and Java, the present dynamically typed programming language provides full I/O facilities built directly into the language. Prior art languages rely upon system provided libraries and functions to perform required I/O operations. Even though Java has the concept of streams, which is an object supplied by the java.io package that supplies methods for reading and writing, the present language provides a full set of input and output operations on built-in values called streams built directly into the language.

Figure 11:
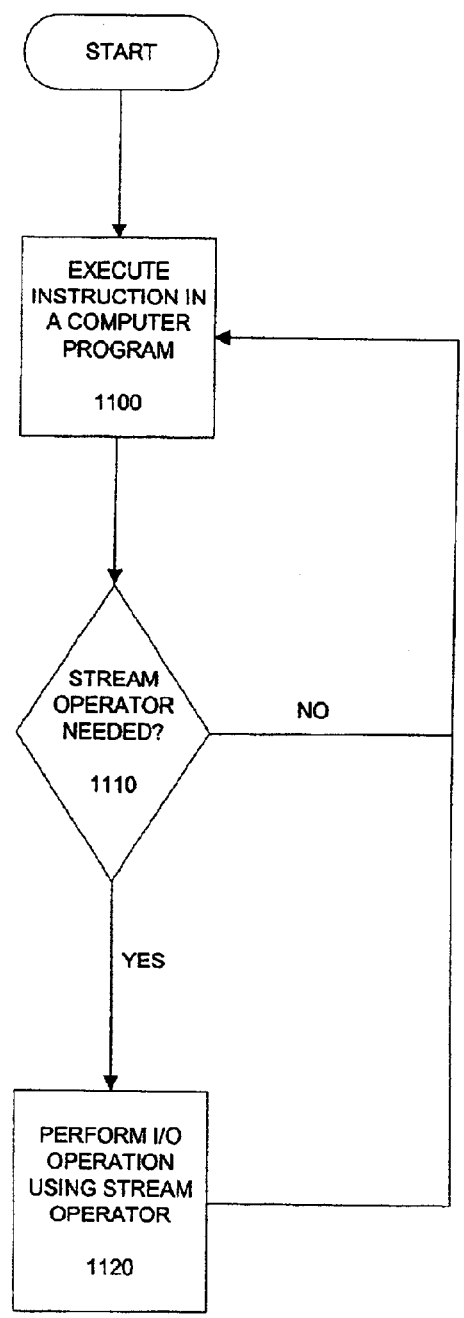
FIG. 11 is a flowchart illustrating one embodiment of the present invention using streams.

FIG. 11 shows one embodiment of the present invention that uses streams. At box 1100 an instruction of a computer program is executed. At box 1110, a check is made to see if a stream operator is needed to execute the instruction. If one is needed, then at box 1120, an I/O operation is performed using the stream operator before returning to box 1100 to execute the next instruction. If one is not needed, then the next instruction of the computer program is executed at box 1100.

In one embodiment, the stream operator allows the content of one value to be copied to another. A stream in the present embodiment is a type of object that is a communications channel usually connecting a program to a device. There are 3 predefined streams in one embodiment of the present language, viz. stdin, stdout, and stderr, which are connected to the standard input, standard output, and standard error devices of the operating system respectively. For example, in order to write a value to a stream, the stdout stream operator may be used:

var name="Ned"

name→stdout

This writes the string name to the stream stdout. Streams can also be used for inputting values to a program. For example:

var x=0 stdin→x

This reads from standard input to the integer variable 'x'. It must be noted here that the usual conversions (in the example above, it's the conversion from ASCII to binary) are performed when reading or writing to streams. As mentioned earlier, streams may be connected to files, terminals, pipes, networks, threads, and objects, etc, and can be categorized as standard streams, file streams, and network streams.

Standard Streams

Like prior art languages, the present dynamic language has a set of standard streams connected to the standard devices of the system. There is one connection to the standard output (stdout), one to the standard input (stdin), and one to the standard error device (stderr). These are set up by the interpreter, and are available to anything in a program using the present language. For example, to write an error message to the standard error stream, one can write: ["Error: incorrect range: ", a, "to ", b, '\n']→stderr. This creates a vector literal and uses the stream operator to write it to standard error. Similarly, to read from the keyboard (usually connected to standard input, but may be redirected), one can write:

```
var limit=-1
stdin→limit
```

In addition to the standard streams, each thread in a program has 2 streams connected to it. These are connected by the system and are called the input and output. For the main program thread, the input is connected to stdin and the output is connected to stdout. The reason these 2 streams are included in the present language is to provide streams that can be redirected without worrying about overwriting the standard stream variables and not being able to direct it back again.

File Streams

File streams are used to access files. They can be attached to a file by opening the file using one of the file-opening functions provided in the System package, and shown in table in FIG. 6A. There are certain caveats for opening a file for input, output, or update, and include:

When opening a file for input, the file must exist. The file is opened and the current position is set to the start of the file. If the file does not exist, an exception is thrown.

When opening a file for output, it is created if it does not exist, or truncated if it does exist. In either case, the current position is the start of the file.

When opening a file for update, it is created if it does not exist, or truncated if it does exist. The stream is capable of reading and writing to the file, and the current position is set to the end of the file.

Figure 13:
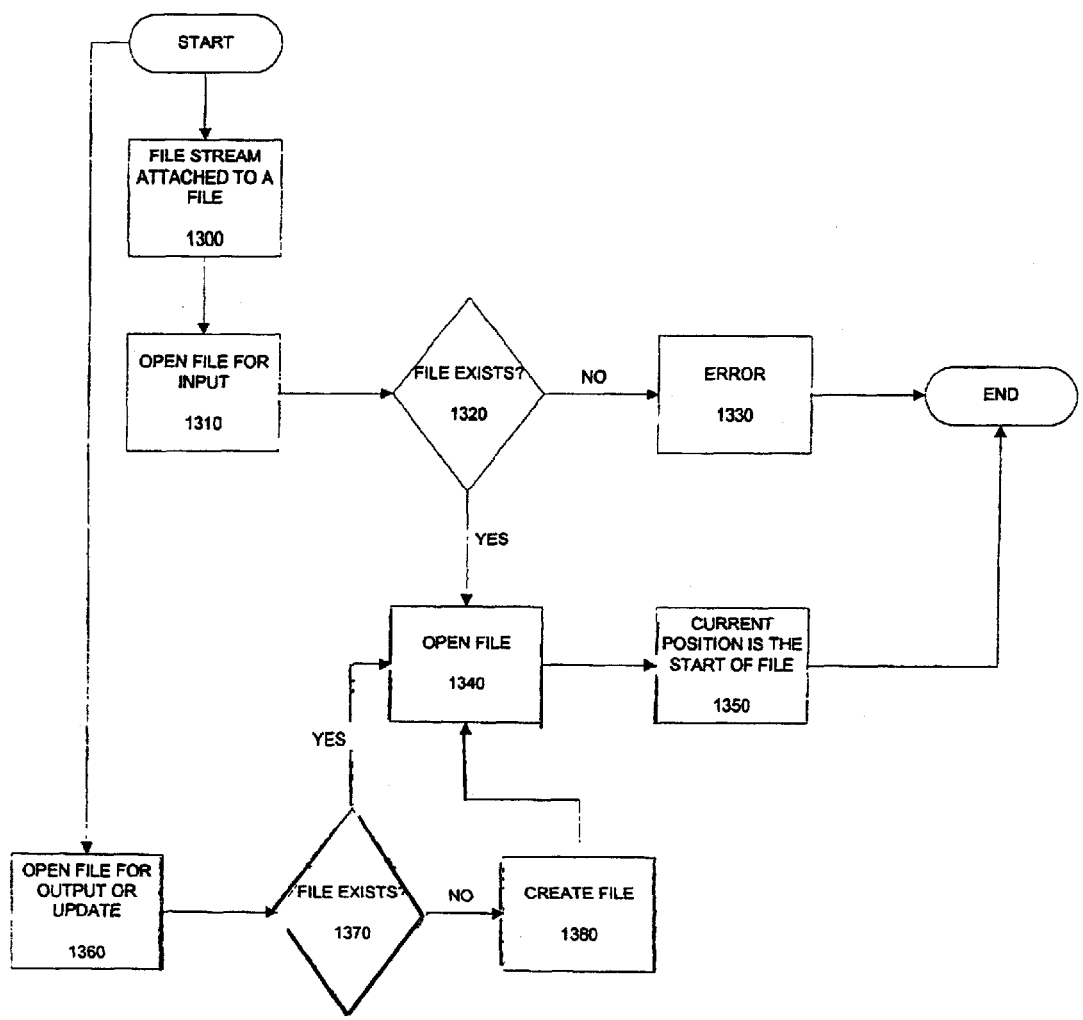
FIG. 13 is a flowchart illustrating the caveats for opening a file of the present invention for input, output, or update.

FIG. 13 illustrates the caveats for opening a file for input, output, or update. At box 1300, a file stream is attached to a file that needs to be opened. At box 1310, the file is opened for input. At box 1320, a check is made to see if the file exists. If it does not, then at box 1330 an error is given to the user. If the file exists, then at box 1340, the file is opened, and at box 1350 the current position is set to the start of the file. At box 1360, if the file is opened for output or for update, then at box 1370, a check is made to see if the file exists. If it does not, then at box 1380 a new file is created before performing tasks in boxes 1340 and 1350. If the file exists, then the tasks in boxes 1340 and 1350 are preformed.

File streams are seekable, according to one embodiment of the present invention. In other words, the current position can be moved with the aid of functions rewind( ) and seek( ) in the System package. The rewind( ) function puts the file pointer to the start of the file. Any reads or writes after a rewind( ) has been performed will happen at the start of the file. Similarly, the seek( ) function allows the file pointer to be moved to any position in the file by moving the file pointer relative to the start, end, or current position in the file.

Figure 14:
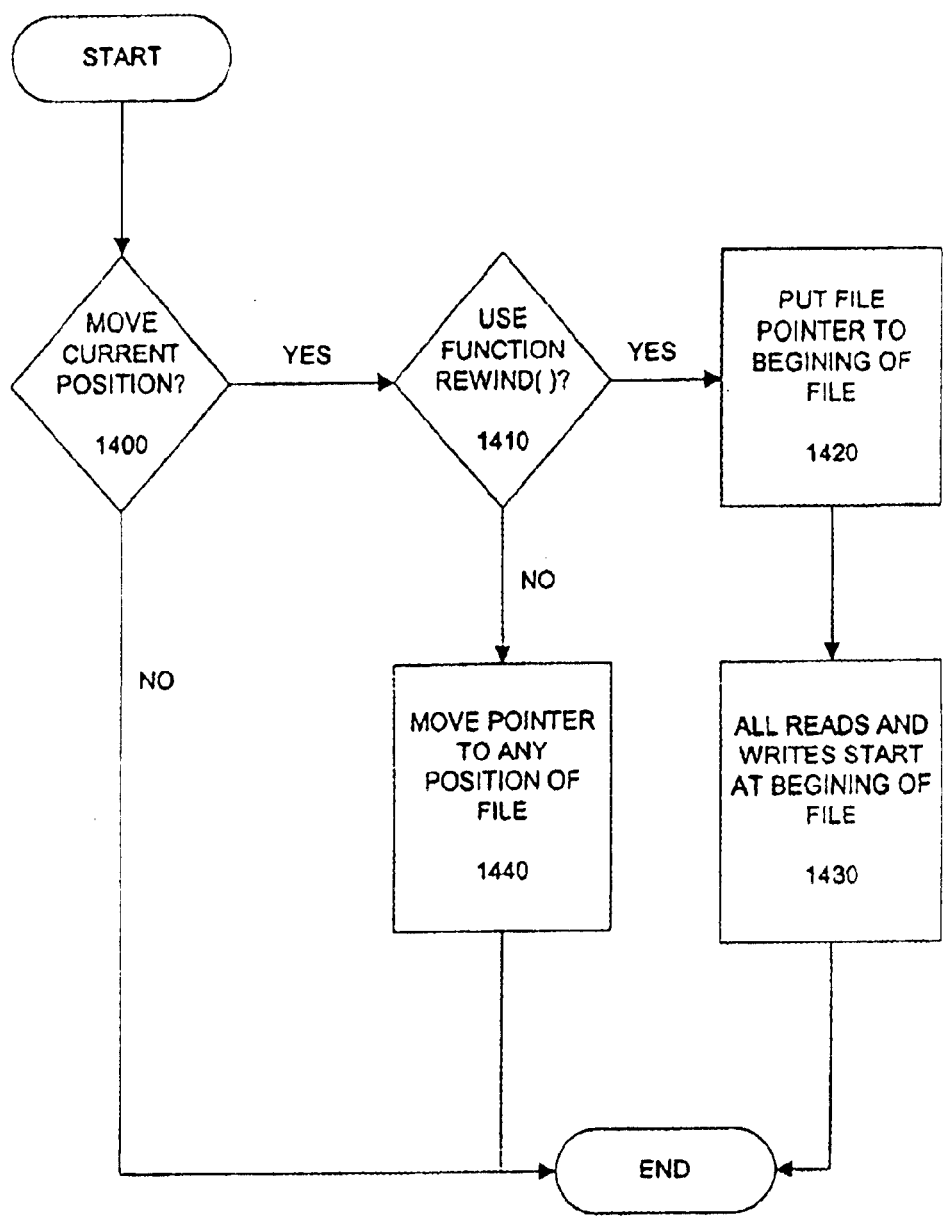
FIG. 14 is a flowchart illustrating how files in the present invention are seekable.

FIG. 14 illustrates how files in the present invention are seekable. At box 1400, a check is made to see if the current position of a file pointer needs to be moved. If the pointer needs to be moved, then at box 1410, a check is made to see if the function rewind( ) needs to be used. If rewind( ) is used, then at box 1420, the pointer is moved to the beginning of the file. At box 1430, all reads and writes start at the beginning of the file. If the rewind( ) function is not used at box 1410, then it is presumed that function seek( ) is used, and at box 1440, the pointer is moved to any position in the file as needed.

Network Streams

The present language has the ability to connect a stream to a network connection, according to one embodiment of the present invention. A stream connected to a network port operates like any other stream except it is not seekable. The Network package contains functions to support network streams, and are seen in the table in FIG. 6B.

Networks consist of a set of interconnected machines, each with a unique address called an Internet Protocol (IP) address. Each machine has a name that can be translated to an IP address by looking it up in a naming service, for example, Domain Naming Service (DNS). The network stream creation function takes an address, which is either a string or an integer value as the parameter. If the address is a string, then the function will either perform a lookup on the name, or if the string conforms to a standard IP address format (4 numbers separated by dots) the function will convert it to an integer. Alternately, if the address is an integer, the function will use the bottom 32 bits of the integer as the IP address.

Figure 15:
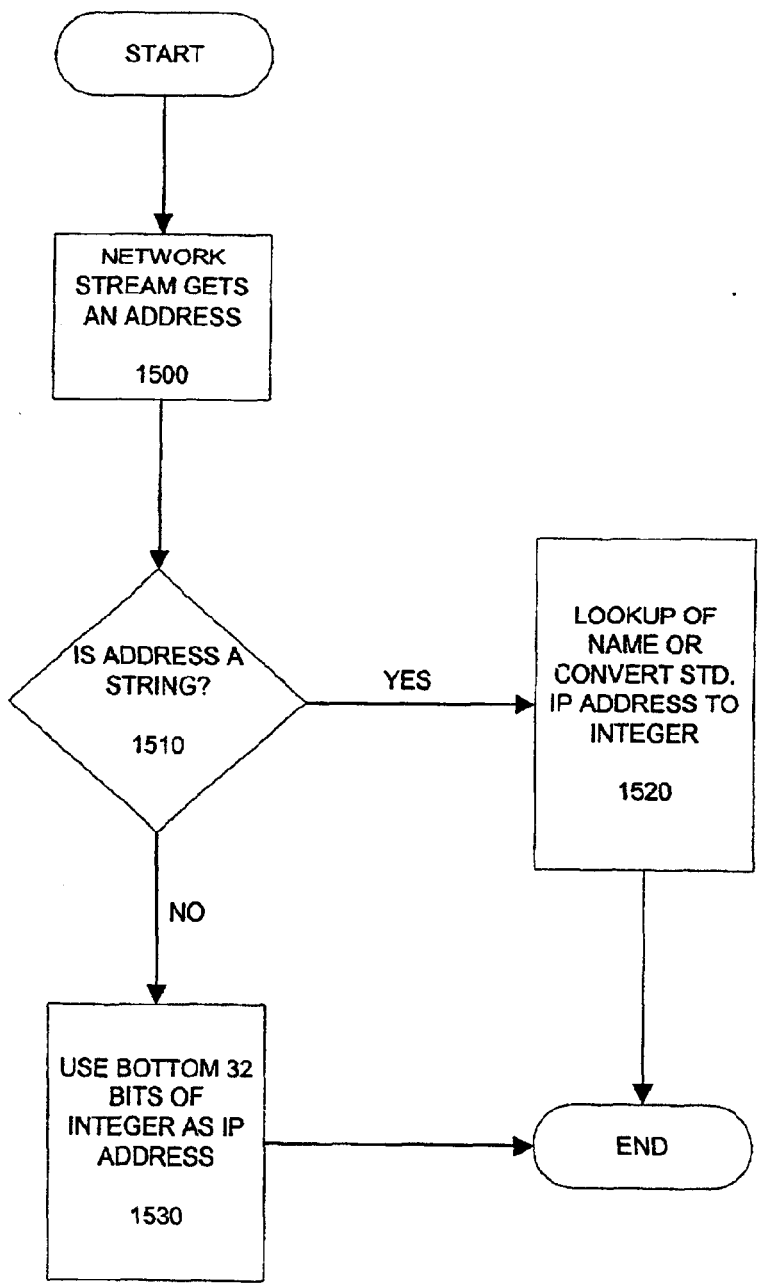
FIG. 15 is a flowchart illustrating how network streams function in the present invention.
Figure 1:
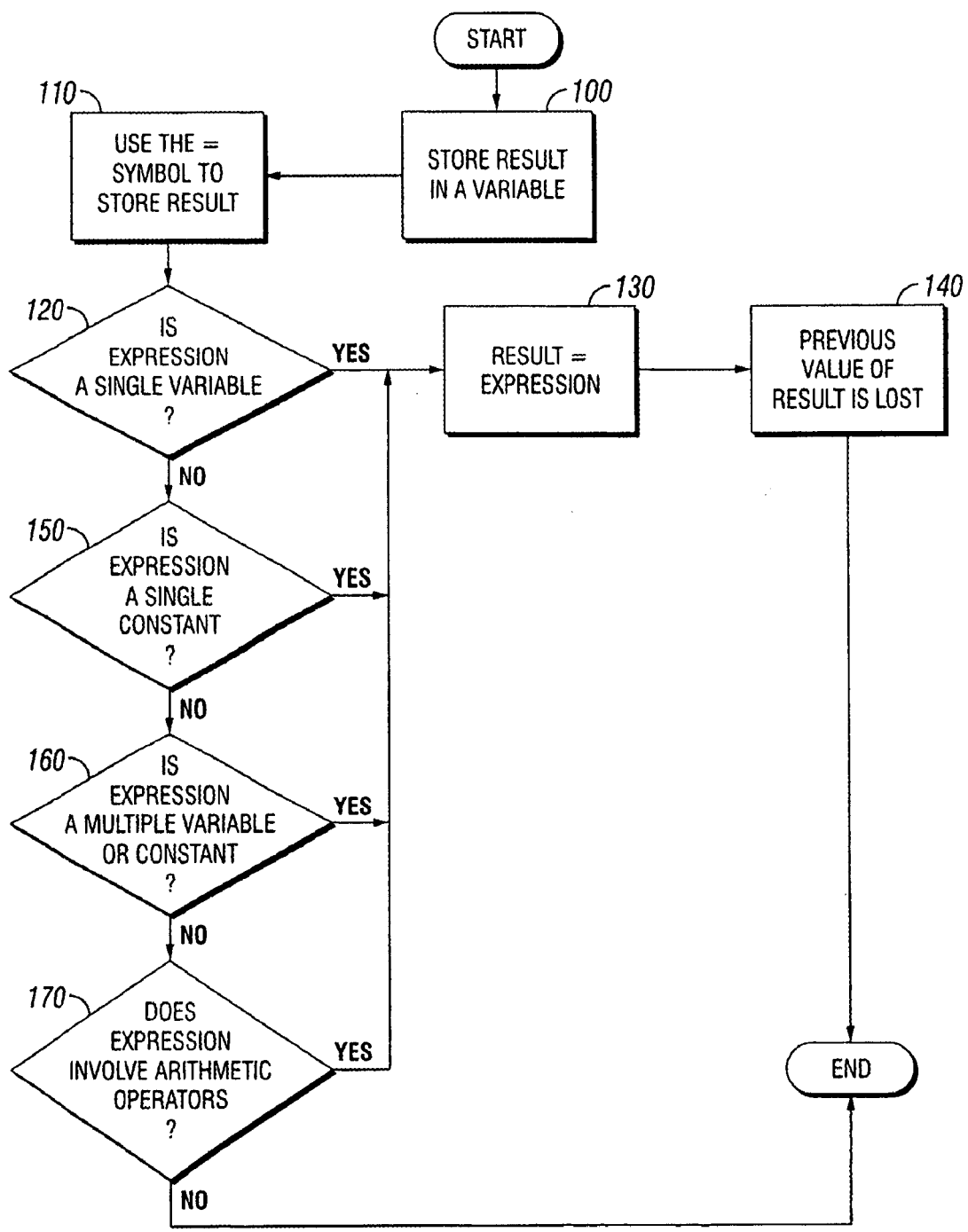
Figure 2:
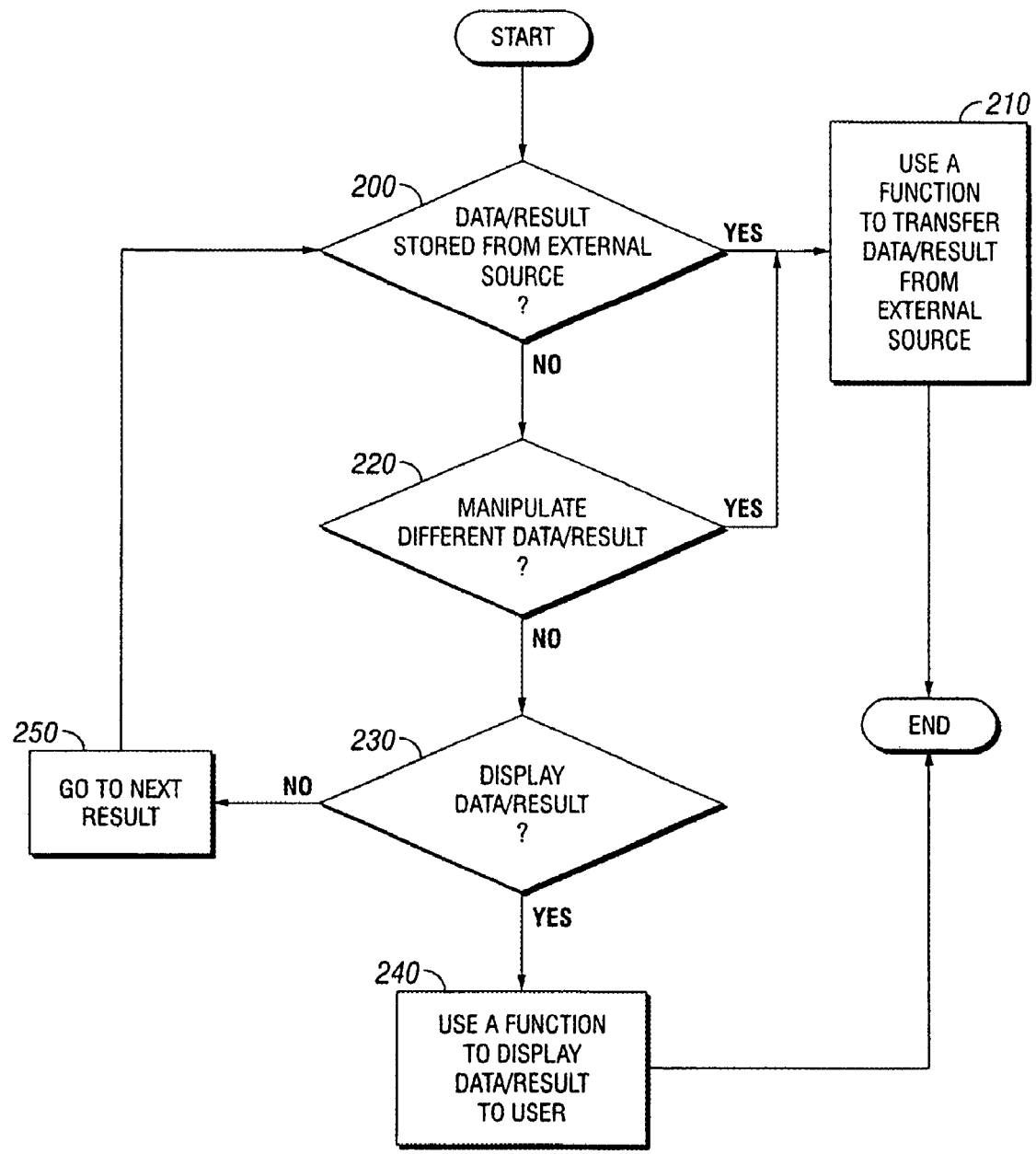
Figure 3:
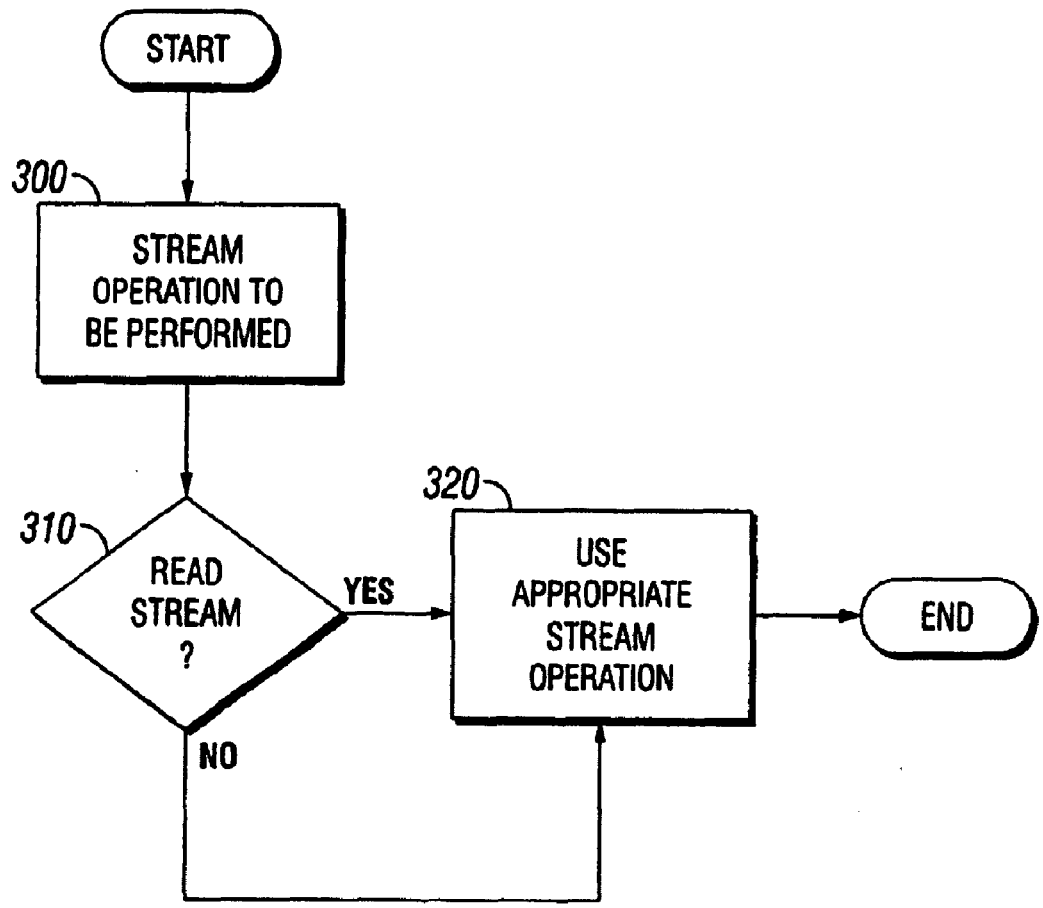
Figure 4A:
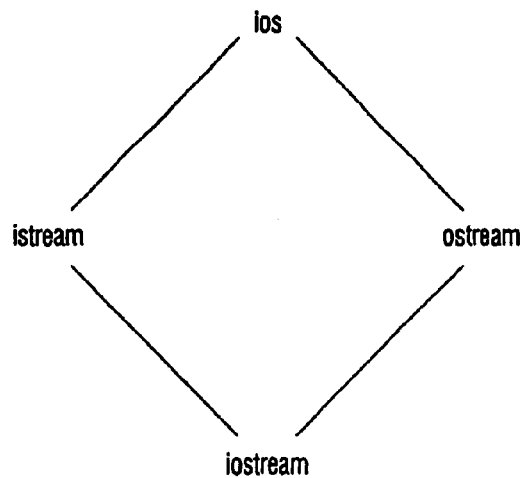
Figure 4B:
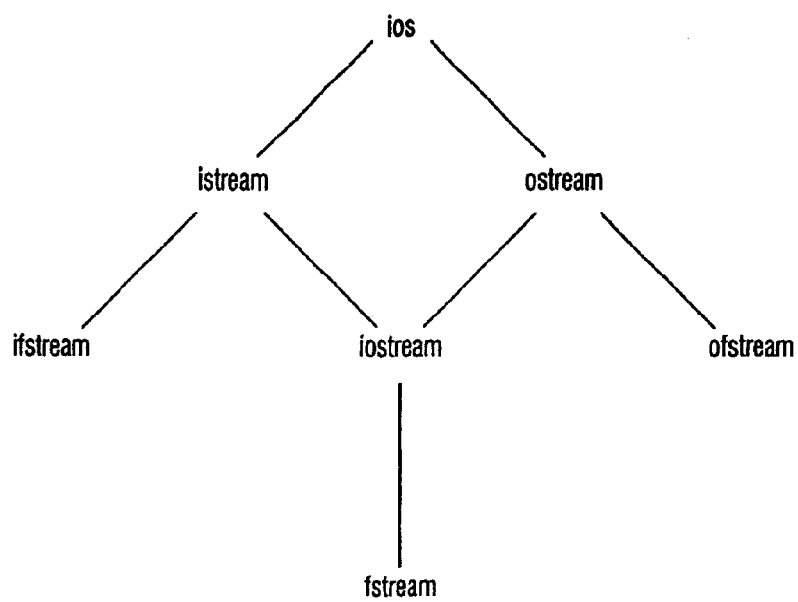
Figure 5A:
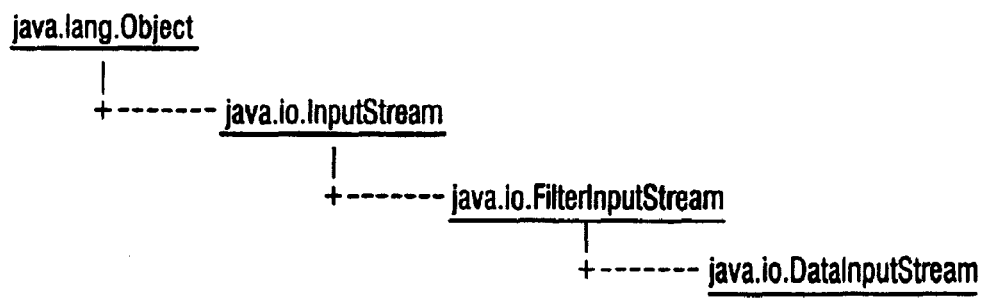
Figure 5B:
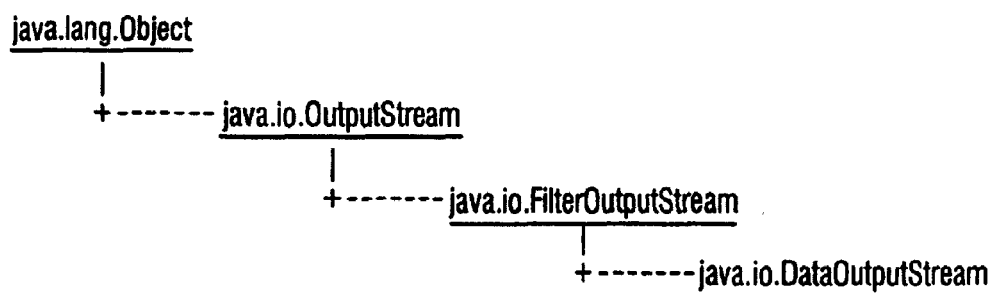
Figure 10:
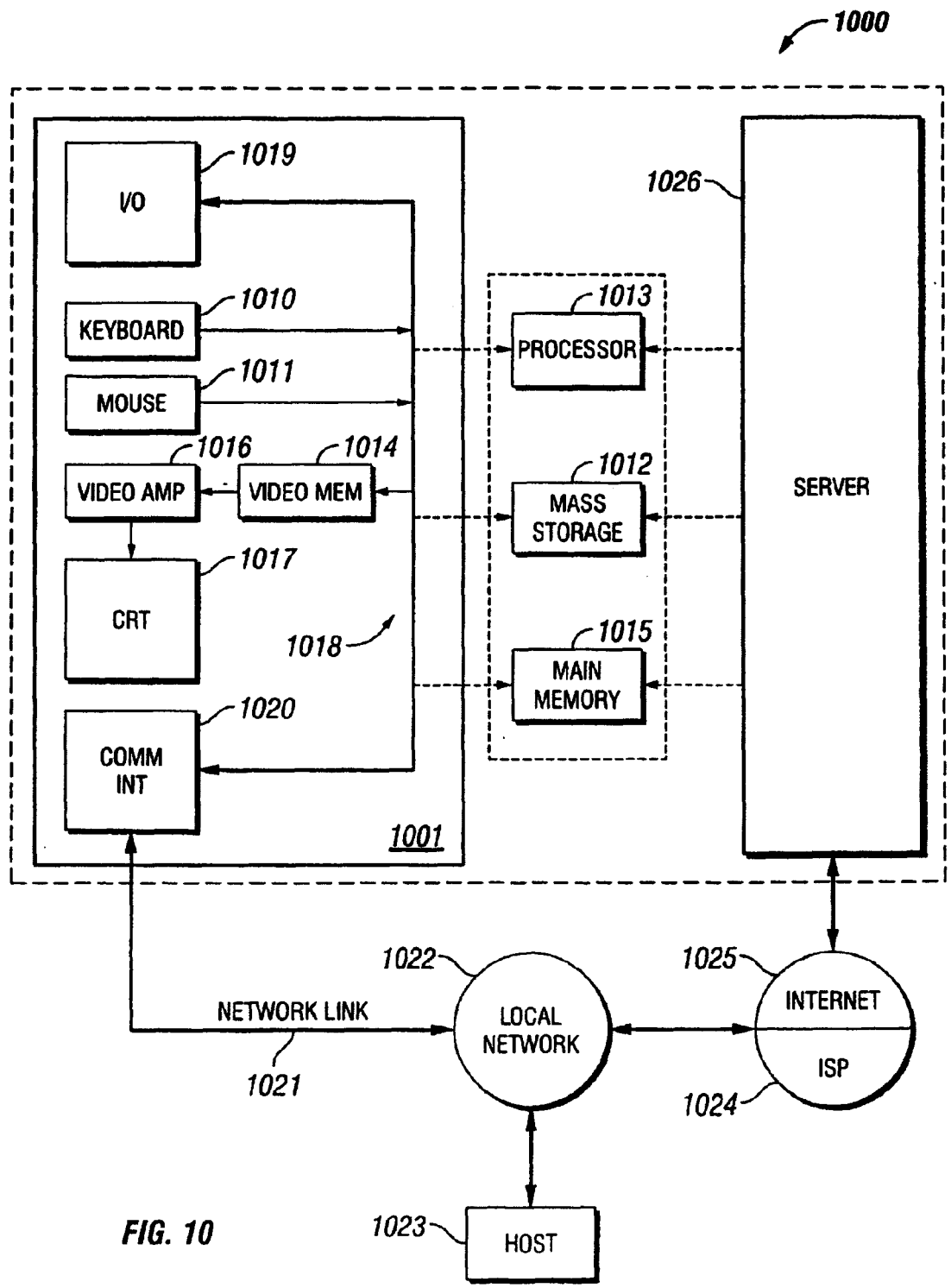
Figure 11:
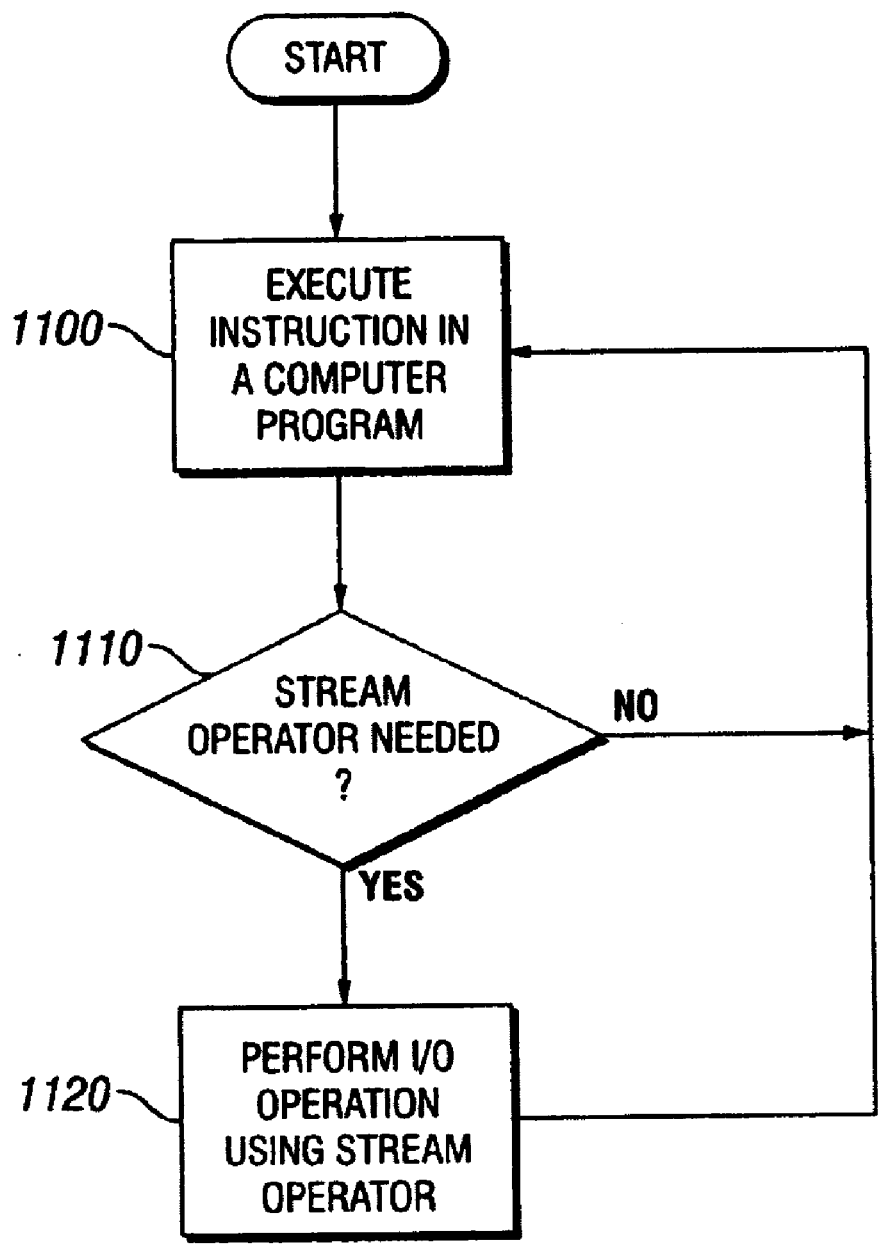
Figure 12:
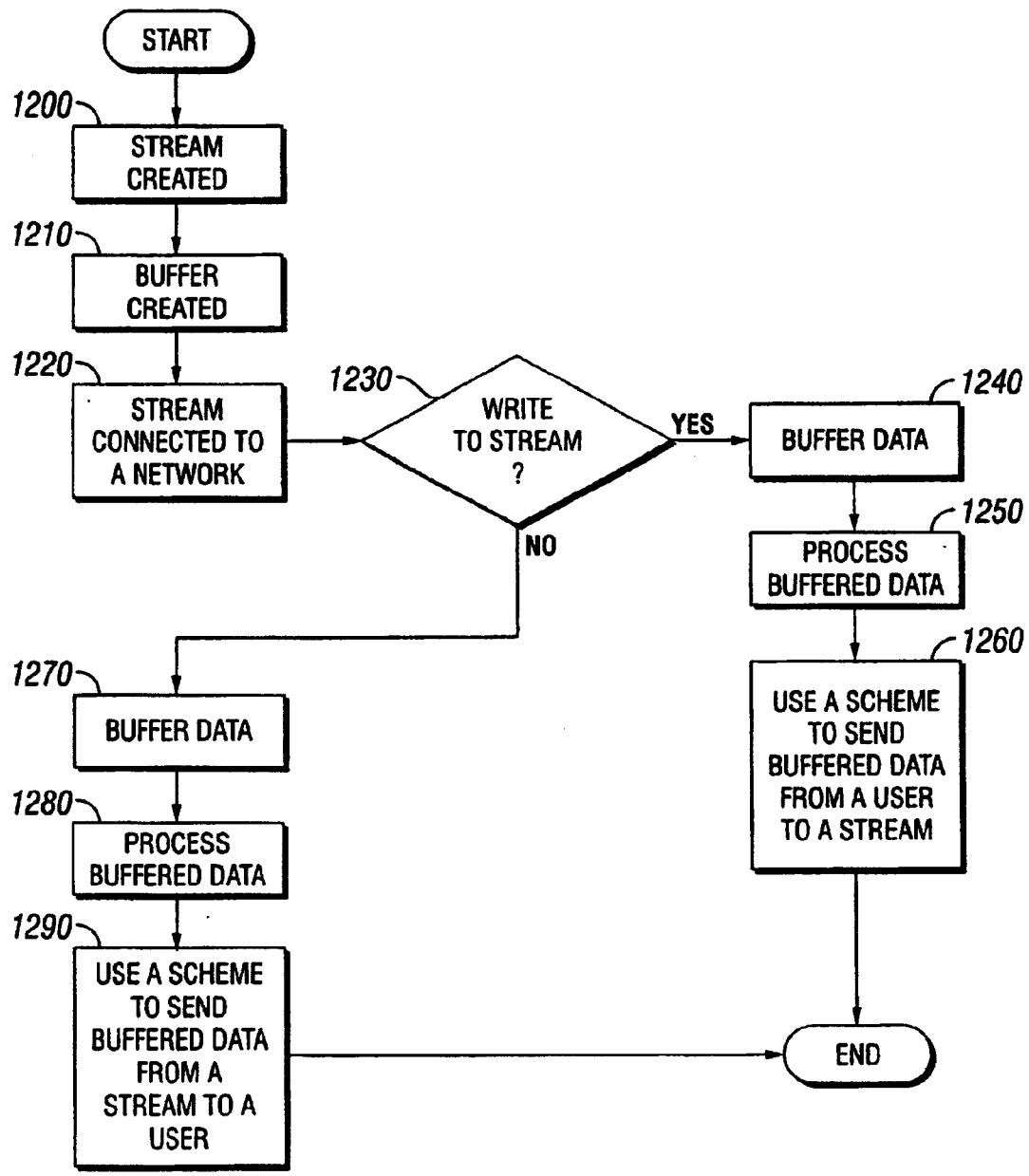
Figure 13:
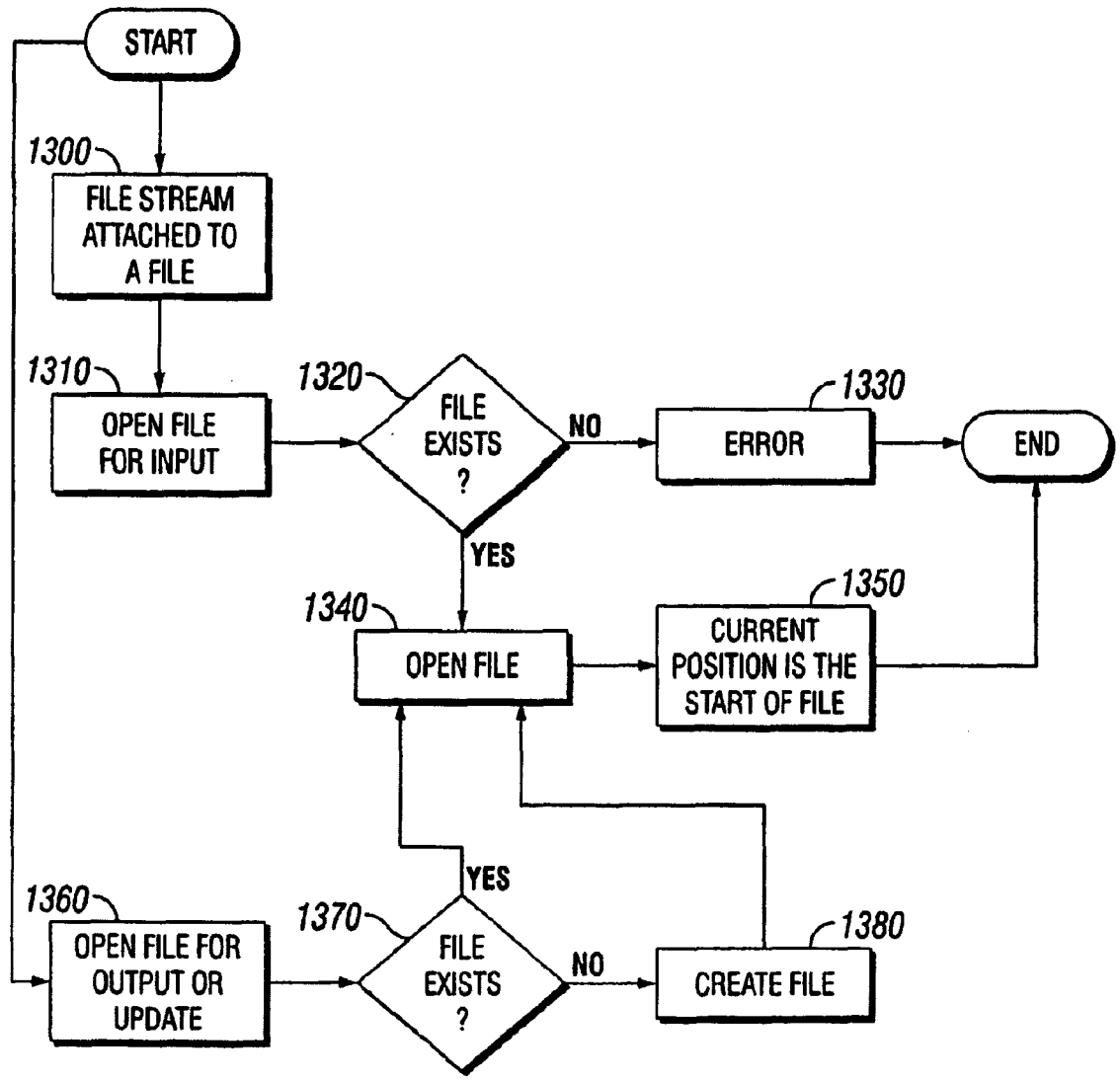
Figure 14:
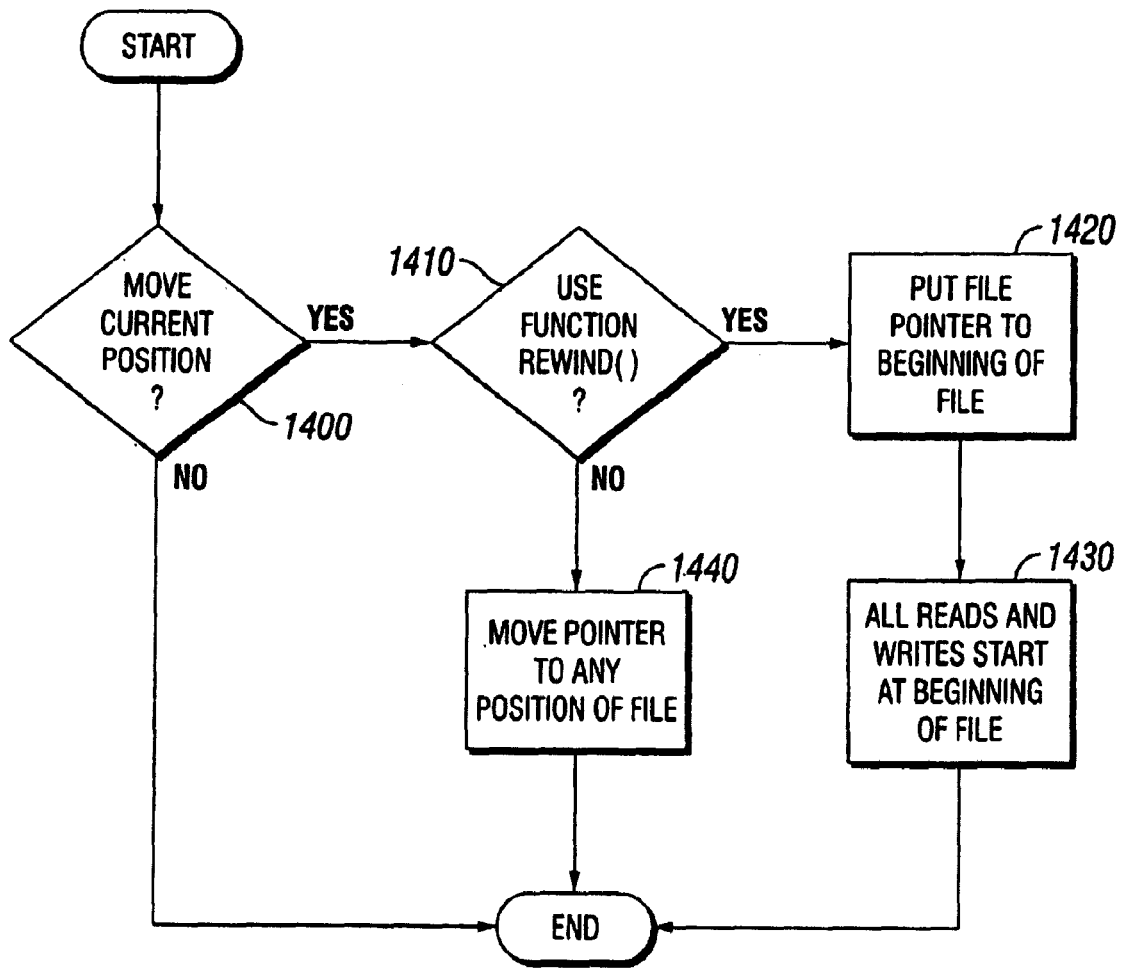
Figure 15:
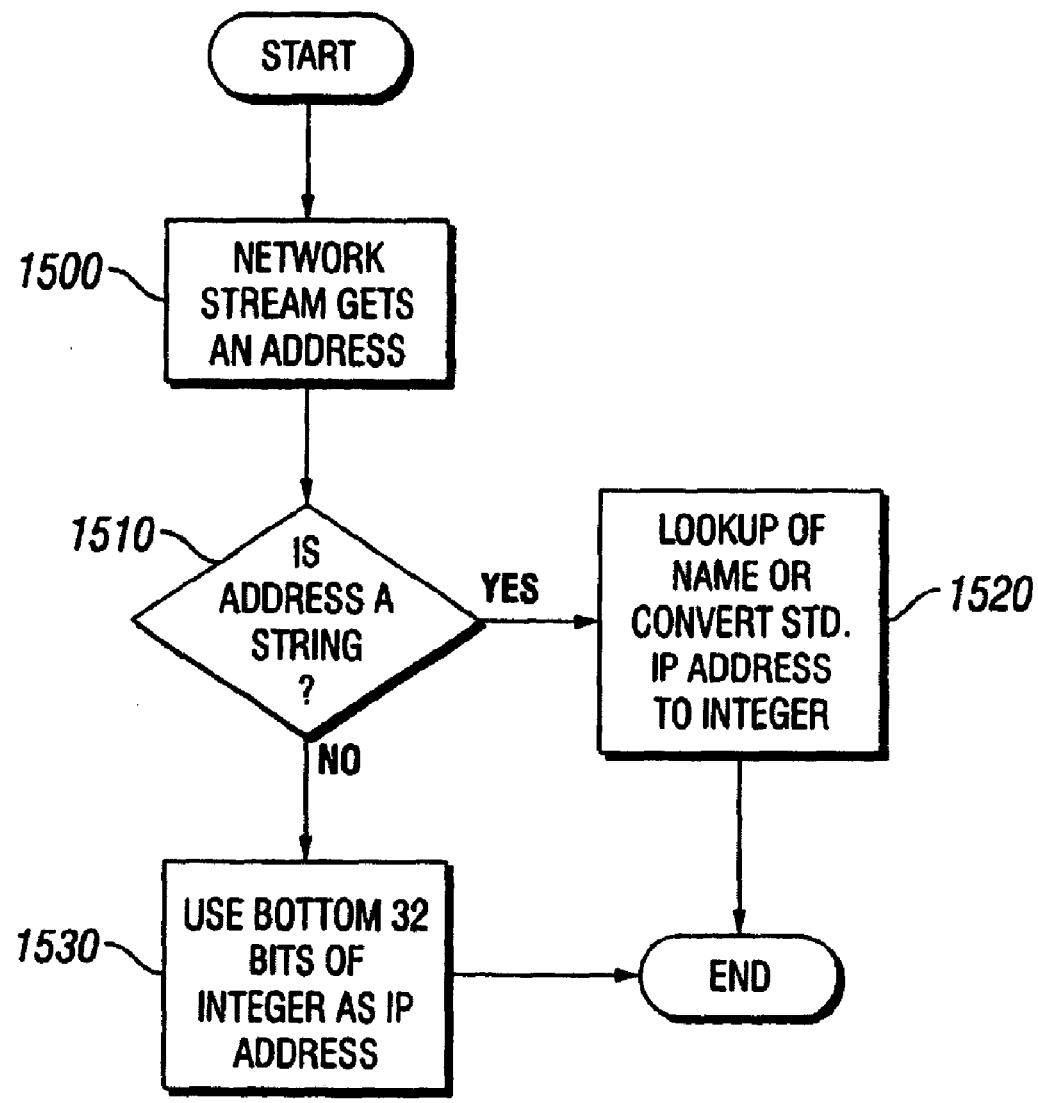

FIG. 15 illustrates how network streams function. At box 1500 a network stream creation function gets an address. At box 1510, a check is made to see if address is in the form of a string. If it is, then at box 1520, a lookup of the name is made, or the standard IP address is converted to an integer. If box 1510 is not a string, then it is presumed that the IP address is in an integer form, and box 1530 uses the bottom 32 bits as the IP address.

There are special considerations for network streams because these streams are not connected to a passive device like a disk drive, but to another program (an active device) running on a different machine. When a stream is connected to a disk drive, there is no harm in sending data at varying speeds, even one character at a time. The only consideration is that of performance. But, when a stream is connected across a network, packetization of the data is of utmost importance, especially since the other end of the connection may not be a program written in the present language, and may only expect packets containing certain specific data. All data sent across a network using network streams can be conformed to all presently available networking protocols, like Transmission Control Protocol (TCP), for example.

Consider a situation where a server (written in some other programming language, like C) gets a connection from a client using the present language. The server protocol for a login application may require that the first packet from the client contains information such as username and password. Further, suppose that the contents of the first packet consists of 2 strings, each terminating in a line-feed character. The client can be written as:

```
// login to the server using a username and password
function login (server, username, password){
    function write (s) {
        [s, '\n'] → server
        System.flush (server)
    }
    write (username)      // Write username
    write (password)      // Write password
}
```

The above program may cause a protocol error in the server because there will be two packets sent to the server instead of one. The flush( ) call within the write( ) function will cause a packet to be sent for both the username and password. This particular program is easily fixed by moving the call to the flush( ) function until all data has been sent out.

Another consideration is with the use of strings. When reading a string from a stream, the stream operator expects a line-feed character to be present at the end of the string, which may not be present sometimes. If this occurs, then each character of the string will have to be read individually until the terminating character of the string.

Reading and Writing Streams

Streams can be read and written using the stream operator. The operator understands the type of data being read into or written from, and behaves differently depending on the data type. The table in FIG. 7 illustrates the behavior for different data types. For example, the data type integer is read as a decimal integer converted to its binary form, and written as a decimal integer.

Figure 1:
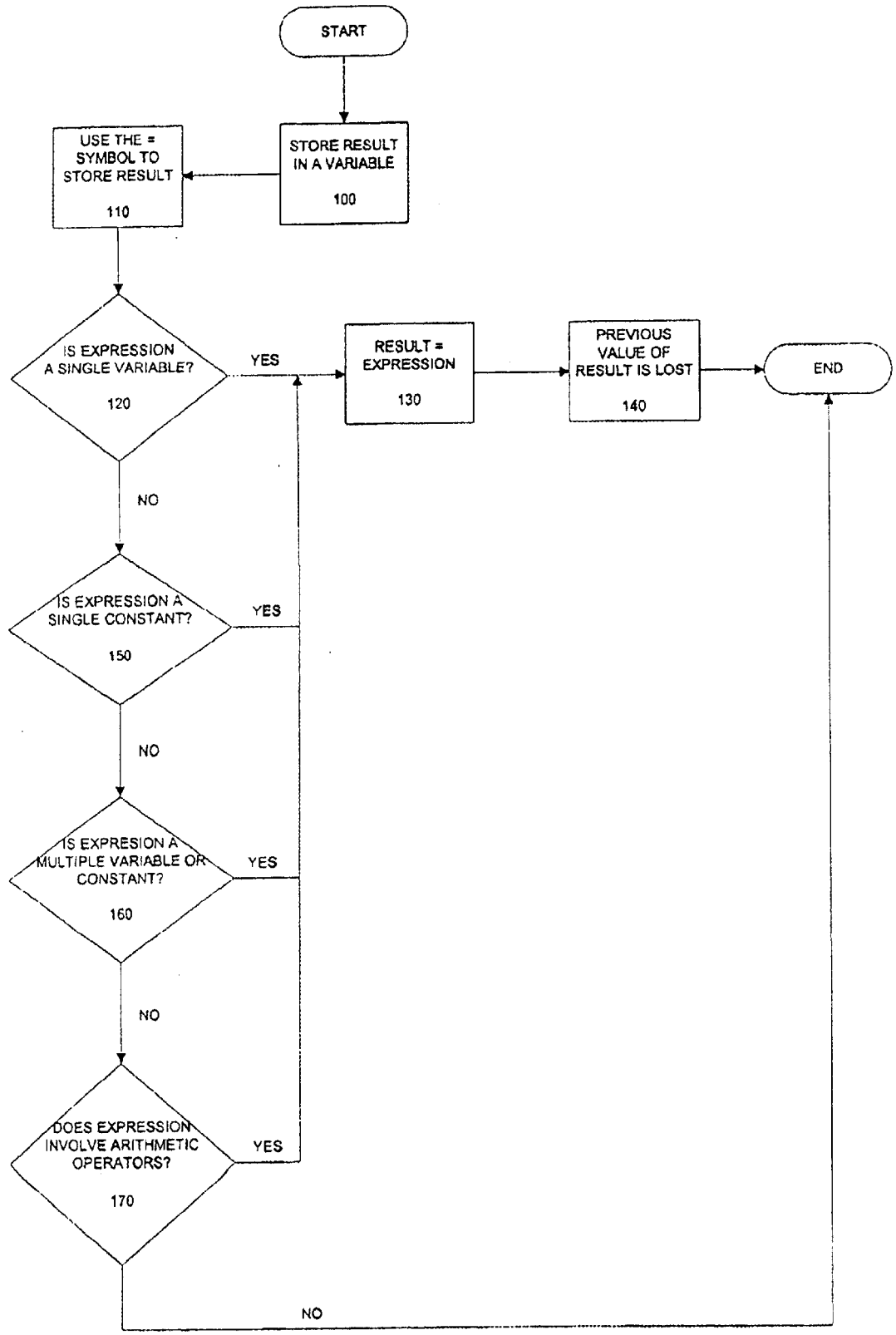
FIG. 1 is a flowchart illustrating a method to store a result.
Figure 2:
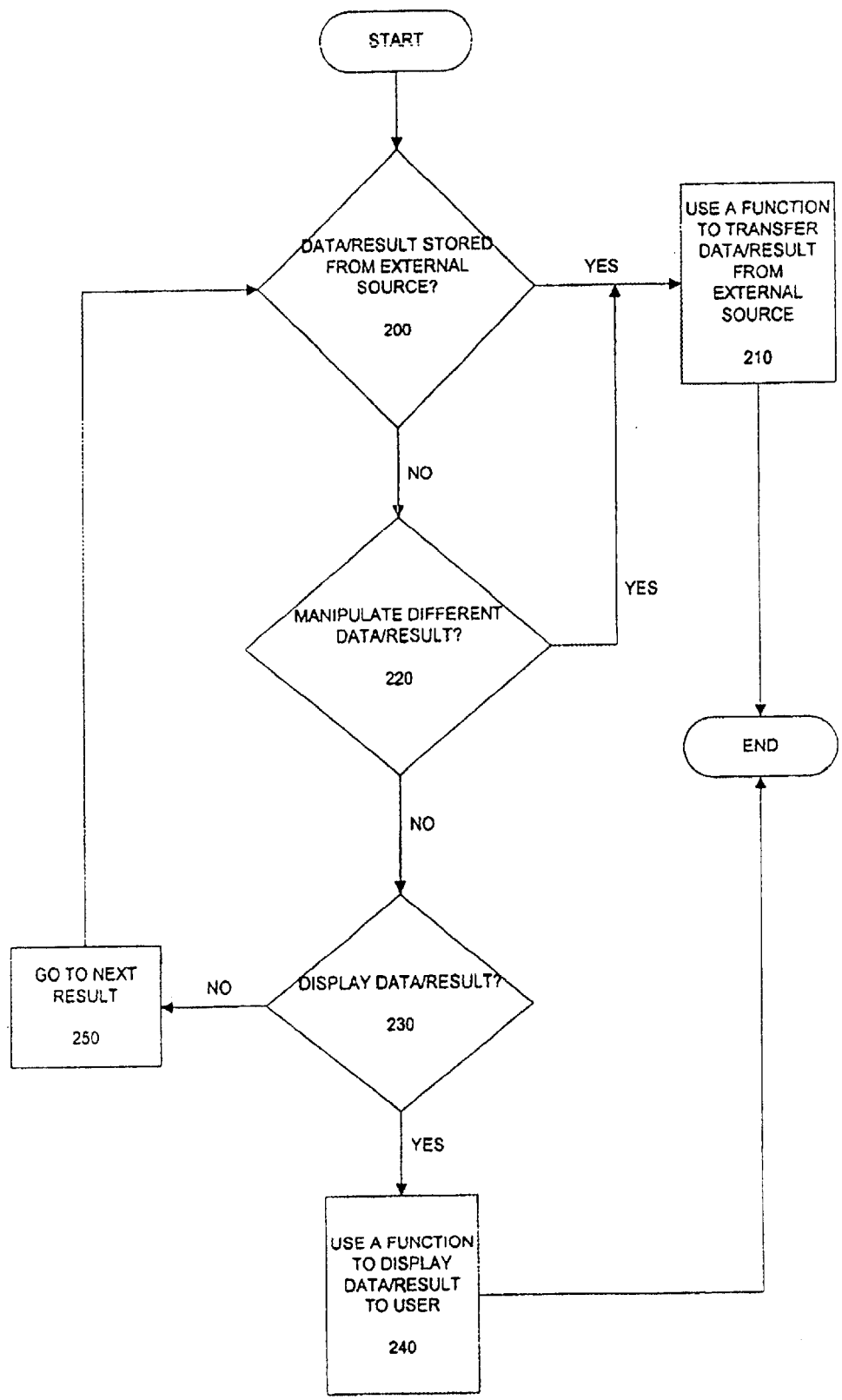
FIG. 2 is a flowchart illustrating another method to store a result.
Figure 3:
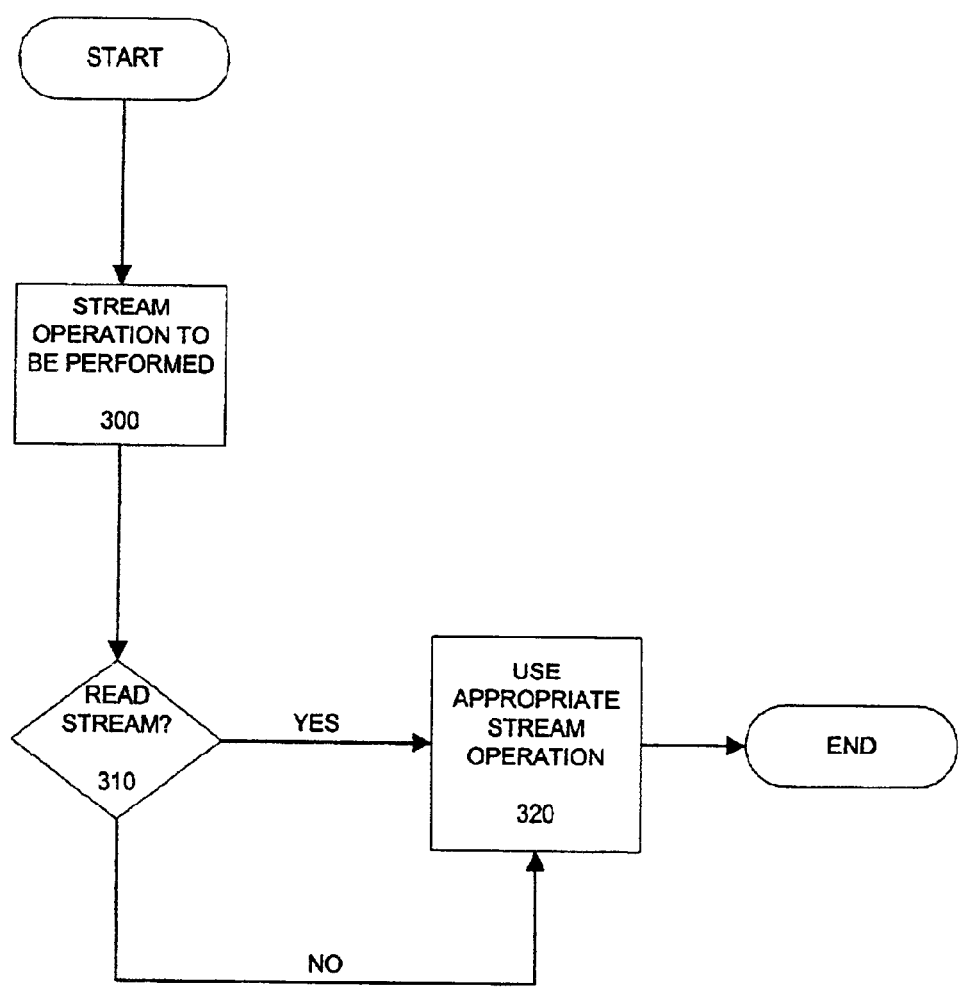
FIG. 3 is a flowchart illustrating the use of a stream operator to read or write streams in the present invention.
Figure 4A:
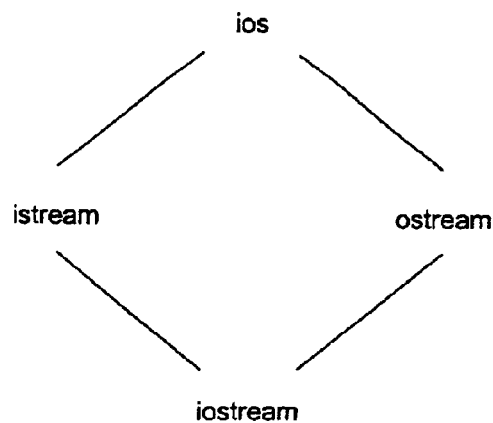
FIG. 4A is a portion of the stream I/O class hierarchy in C++.
Figure 4B:
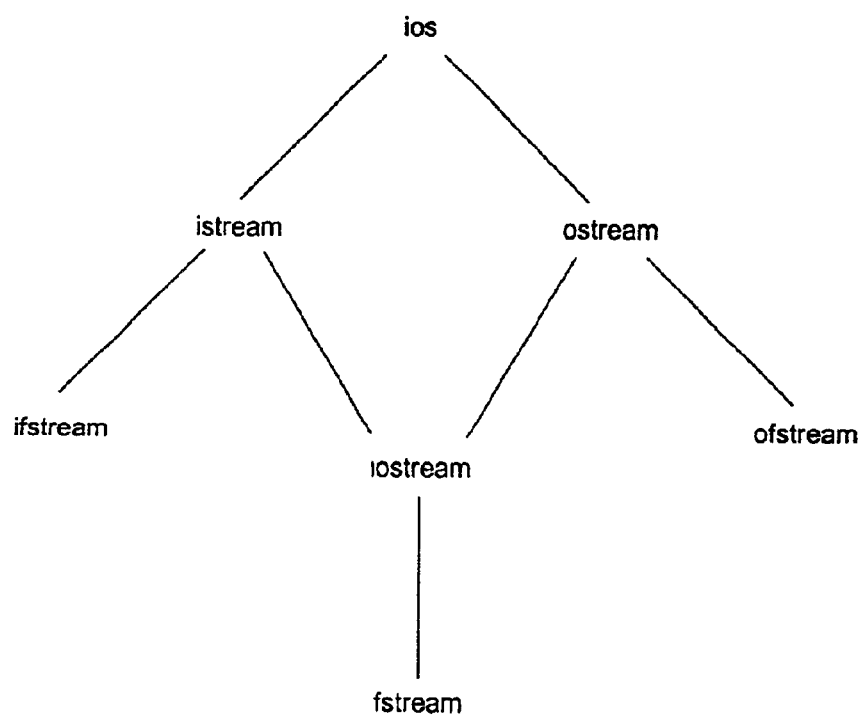
FIG. 4B is a portion of stream I/O class hierarchy with key file-processing classes in C++.
Figure 5A:
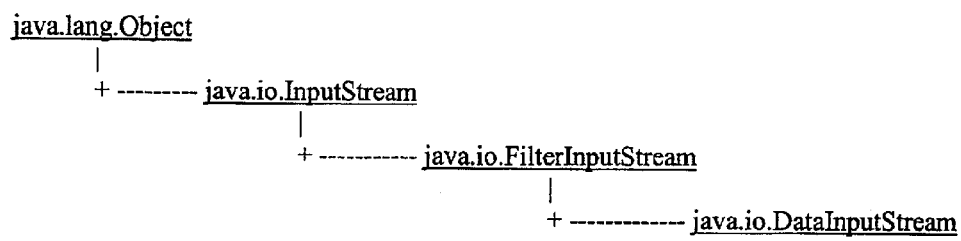
FIG. 5A shows a hierarchical tree for the DataInputStream class.
Figure 5B:
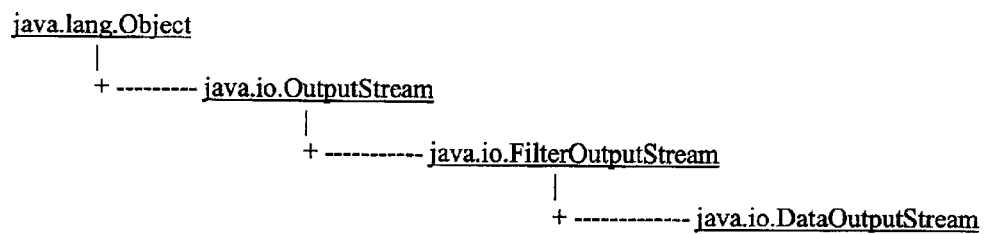
FIG. 5B shows a hierarchical tree for the DataOutputStream class.

FIG. 3 illustrates the use of the stream operator to read or write streams. At box 300, a stream operation needs to be performed. At box 310, a check is made to see if a stream is needed to be read. If it is, then at box 320, a stream operator appropriate to the kind of stream to be read is used. If not, then the stream needs to be written, and an appropriate stream operator is used to write the stream.

In addition to creating, reading, and writing streams, the present language provides a set of operations that can be used to manipulate them. These operations are held in a System package, and are illustrated in a table in FIG. 8. For example, the operation close that takes as its input a stream parameter results in closing the stream.

Stream Operator

The stream operator provides a method for input and output in a program handled by the present language. The operator takes two operands, and is in the form: stream1→stream2. The contents of stream1 are copied to stream2. The operands can be of any type and the interpreter has code to deal with all built-in types. For example:

| | |
|---|---|
| var x = 0 | // Integer variable |
| var s = " " | // String variable |
| var v = [ ] | // Vector variable |
| stdin -> stdout | // Copy standard input to standard output |
| "hello world" -> stdout | // Writes "hello world" to stdout |
| 56 -> outstream | // The integer 56 |
| ["the result is: ", result] -> output | // Vector literal. Each element written in sequence. |
| x -> output | // Write variable x |
| stdin -> x | // Read from stdin to x |
| input -> s | // Read string from input and write to s |
| x -> v | // Append variable x to vector v |

The rules for the various built-in types are mentioned in FIG. 9. For example, if the output type is an integer, the input type can take any of the 10 input types mentioned in FIG. 8. If for example, the input type is an integer, then it is copied from left to right, on the other hand if the input type is a real number, it is first converted to an integer before read from left to right. In some respects the stream operator acts like the cast operator for arithmetic types, where the results of a stream operator is the result returned by the right operator. For example, if the right operator is a block type (function, etc.), or an overloaded stream operator, then the result is the value returned by that block. All the results of a block call are appended to a vector, which allows stream operators to be linked together.

For example:

| | |
|---|---|
| var lines = [ ] | // Vector variable |
| lines = instream → func( ) | |

This reads all the lines from the stream and applies the function func( ) to each line, one at a time. The vector lines holds the result of the function func( ) for each line.

Similarly, var lines=[ ]
instream→func1( )→func2( )→lines

This sets the vector lines to the results of applying func1( ) and func2( ) to each line of the input.

Stream Buffering

In order to avoid performance penalties and erratic behavior due to the latencies of the hardware devices, streams are not connected directly to their devices. Rather, the streams have a buffer embedded in them to insulate the user of the stream from the hardware. This buffer is an area of memory that is used to hold data that is either waiting to be read by a stream user, or is waiting to be written to a device. For example, if a stream is connected to a network, and there was no buffering, then any write to the stream would cause a packet to be transmitted over a network. This is not only undesirable in terms of performance, but also may not be what is expected by the receiver of the packets. Buffering also helps the incoming side by providing a FIFO for incoming data that is not yet processed by the stream user.

Figure 12:
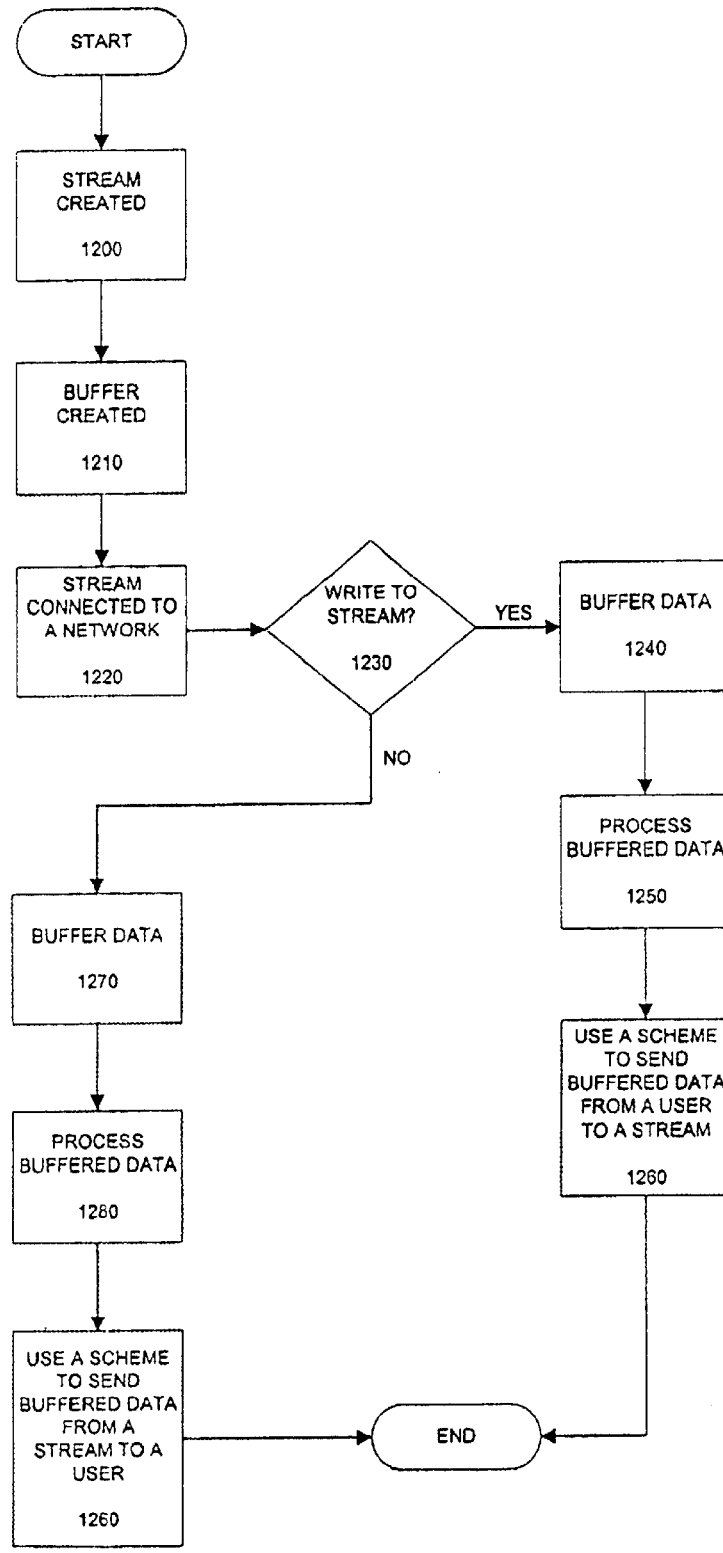
FIG. 12 is a flowchart illustrating the use of buffers to buffer data before writing to or reading from a stream in the present invention.

FIG. 12 illustrates the use of buffers to buffer data before writing to or reading from a stream. At box 1200, a stream is created. At box 1210, a buffer for the stream is created when the stream is created. At box 1220, the created stream is connected to a network. At box 1230, a check is made to see if data needs to be written to the stream by a user via the network. If so, then at box 1240, the data to be written is buffered in the buffer created at box 1210. At box 1250, the buffered data is processed, and at box 1260 the processed data is sent using a scheme, for example a FIFO scheme, to the designated stream. If at box 1230 the data needs to be read from a stream instead of written to it, then at box 1270 the data is buffered in the buffer created at box 1210. At box 1280, the buffered data is processed, and at box 1290 the processed data is sent from a stream using a scheme, for example a FIFO scheme, to a user on the network.

In one embodiment, the default size of the buffer is 512 bytes, but can be controlled by a special attribute called StreamAttributes.BUFFERSIZE by setting the setStreamAttribute( ) operation. For example, if no buffering is required, then the following is set on the open stream:

System.setStreamAttribute(s, System.StreamAttributes.BUFFERSIZE, 0).

Alternatively, a large buffer size can be chosen for, say, a network stream by:

System.setStreamAttribute(net, System.StreamAttributes.BUFFERSIZE, 8192).

There are several operations that can be performed on the buffer including:

Flushing buffers to the hardware by using the flush( ) operation.

Reading a whole buffer into a string data type by calling the getbuffer( ) operation.

Looking to see how many characters remain in the buffer by calling the availableChars( ) operation.

Embodiment of a Computer Execution Environment

Figure 10:
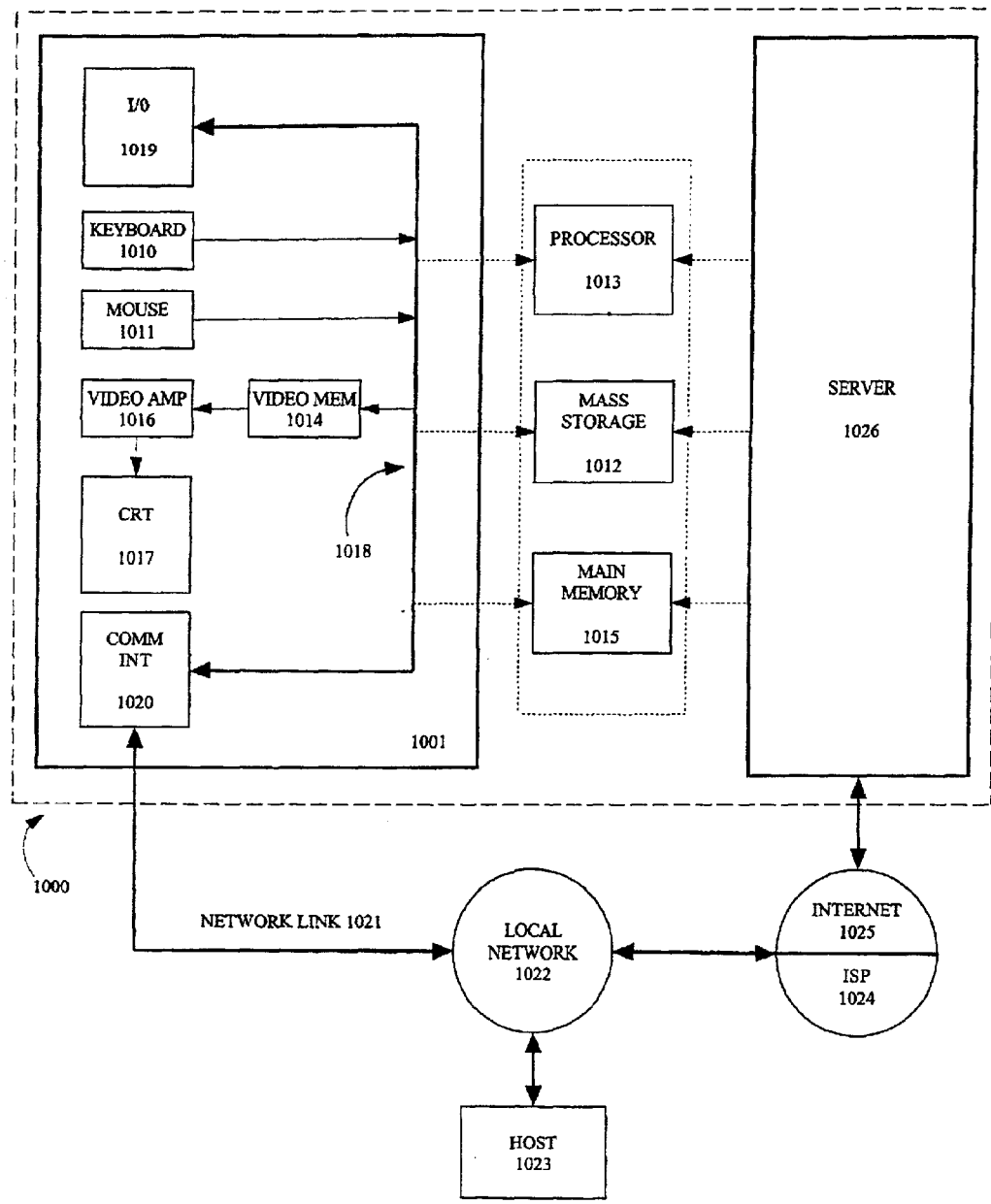
FIG. 10 is an illustration of an embodiment of a computer execution environment.

An embodiment of the invention can be implemented as computer software in the form of computer readable code executed in a desktop general purpose computing environment such as environment 1000 illustrated in FIG. 10, or in the form of bytecode class files running in such an environment. A keyboard 1010 and mouse 1011 are coupled to a bi-directional system bus 1018. The keyboard and mouse are for introducing user input to a computer 1001 and communicating that user input to processor 1013.

Computer 1001 may also include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals, which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals, which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. In the case where processor 1013 resides wholly on server 1026, the results of the computations performed by processor 1013 are transmitted to computer 1001 via Internet 1025, Internet Service Provider (ISP) 1024, local network 1022 and 110 communication interface 1020. In this way, computer 1001 is able to display the results of the computation to a user in the form of output. Other suitable input devices may be used in addition to, or in place of, the mouse 1011 and keyboard 1070. I/O (input/output) unit 1019 coupled to bi-directional system bus 1018 represents such I/O elements as a printer, A/V (audio/video) I/O, etc.

Computer 1001 includes a video memory 1014, main memory 1015 and mass storage 1012, all coupled to bi-directional system bus 1018 along with keyboard 1010, mouse 1011 and processor 1013.

As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device, Internet ready cellular phones, and other Internet computing devices.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014, and mass storage 1012. Alternatively, multiplex data/address lines may be used instead of separate data and address lines.

In one embodiment of the invention, the processor 1013 is a microprocessor manufactured by Motorola, such as the 680×0 processor or a microprocessor manufactured by Intel, such as the 80×86 or Pentium processor, or a SPARC microprocessor from Sun Microsystems, Inc. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code may be executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022, and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for implementation of an I/O stream operator in a dynamically typed language is described in conjunction with one or more specific embodiments. The invention is defined by the following claims and their full scope of equivalents.

I claim:

1. A method executing on a computer readable medium for implementing a stream operator built into an environment comprising:

determining if an I/O operation in said environment having said stream operator occurs; and performing said I/O operation with said stream operator is said I/O operation occurs, wherein the environment supports dynamic typing.

2. The method executing on a computer readable medium of claim 1 wherein said stream operator allows a value of one type to be streamed to a value of another type.

3. The method executing on a computer readable medium of claim 1 wherein said stream operator allows a value of one type to be streamed to a value of type stream.

4. The method executing on a computer readable medium of claim 1 wherein said stream operator allows a value of type stream to be streamed to a value of another type.

5. The method executing on a computer readable medium of claim 2 wherein said one type is of any type supported by said environment.

6. The method executing on a computer readable medium of claim 4 wherein said any type can be modified depending on the type of operands of said environment.

7. The method executing on a computer readable medium of claim 1 wherein said stream operator is used to access files.

8. The method executing on a computer readable medium of claim 1 wherein said stream operator is used to connect to a network.

9. A computer program product comprising:
a computer useable medium having computer readable program code embodied therein configured to implement a stream operator built into an environment, said computer program product comprising:
computer readable code configured therein to cause a computer to determine if an I/O operation in said environment having said stream operator occurs; and
computer readable code configured therein to cause a computer to perform said I/O operation with said stream operator if said I/O operation occurs,
wherein the environment supports dynamic typing.

10. The computer program product of claim 9 wherein said stream operator allows a value of one type to be streamed to a value of another type.

11. The computer program product of claim 9 wherein said stream operator allows a value of one type to be streamed to a value of type stream.

12. The computer program product of claim 9 wherein said stream operator allows a value of type stream to be streamed to a value of another type.

13. The computer program product of claim 10 wherein said one type is of any type supported by said environment.

14. The computer program product of claim 13 wherein said any type can be modified depending on the type of operands of said environment.

15. The computer program product of claim 9 wherein said stream operator is used to access files.

16. The computer program product of claim 9 wherein said stream operator is used to connect to a network.

* * * * *

UNITED STATES PATENT AND TRADEMARK OFFICE
CERTIFICATE OF CORRECTION

PATENT NO. : 7,028,289 B2
APPLICATION NO. : 09/977507
DATED : April 11, 2006
INVENTOR(S) : David S. Allison It is certified that error appears in the above-identified patent and that said Letters Patent is hereby corrected as shown below:

On the Title Page

A drawing was erroneously omitted. Applicant respectfully requests a drawing be inserted on the bottom of the coversheet. Insert Figure 12

In the Drawings:

Please delete Drawing sheets 1 thru 15 and replace with the attached fifteen drawings.

Signed and Sealed this

Seventeenth Day of October, 2006

JON W. DUDAS
*Director of the United States Patent and Trademark Office*

(12) United States Patent
Allison

(10) Patent No.: US 7,028,289 B2
(45) Date of Patent: Apr. 11, 2006

(54) STREAM OPERATOR IN A DYNAMICALLY TYPED PROGRAMMING LANGUAGE

(75) Inventor: David S. Allison, San Ramon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 809 days.

(21) Appl. No.: 09/977,507

(22) Filed: Oct. 12, 2001

(65) Prior Publication Data

US 2003/0093592 A1 May 15, 2003

(51) Int. Cl.
*G06F 9/44* (2006.01)

(52) U.S. Cl. .................................. 717/114; 717/159

(58) Field of Classification Search ............... 717/114, 717/159
See application file for complete search history.

(56) References Cited

U.S. PATENT DOCUMENTS

| | | | |
|---|---|---|---|
| 5,450,600 A | * 9/1995 | Abe | 717/114 |
| 5,598,560 A | * 1/1997 | Benson | 717/159 |
| 6,134,707 A | * 10/2000 | Herrmann et al. | 717/139 |
| 6,138,273 A | * 10/2000 | Sturges | 717/114 |

OTHER PUBLICATIONS

Microsoft GW-BASIC Interpreter User's Guide, Microsoft Corporation, 1988, pp. 10–16, 38–45, 51–55, 61–70, 91–98.*

Using Basic, Rich Didday, West Publishing, 1981, pp. 416–420.*

Fast Power Estimation For Determinstic Input Streams, Luca Benini et al, IEEE, 1997, pp. 494–501.*

Efficient Power Estimation for Highly Correlated Input Streams, Radu Marculescu et al, ACM, 1995, 7 pages.*

UIO: A Uniform I/O System Interface for Distributed Systems, David R. Cheriton Stanford University, ACM, vol. 5, No 1, Feb. 1987, pp. 12–46.*

Testing and Spot–Checking of Data Streams, J. Feigenbaum et al, ACM, 1997, pp. 165–174.*

The Multics Input/Output System, R.J. Feirtag, MIT, ACM 1971, pp. 35–41.*

Optimal Smoothing Schedules for Real–Time Streams, Yishay Mansour et al, ACM, 2000, pp. 21–29.*

* cited by examiner

*Primary Examiner*—Todd Ingberg
(74) *Attorney, Agent, or Firm*—Osha Liang LLP

(57) ABSTRACT

The present invention provides a method and apparatus for implementation of an input/output stream operator in a dynamically typed language. This operator is built into the language, and allows a value of one type to be streamed to a value of another type by taking the form fromvalue→tovalue. Since the programming language is dynamic, the type of values on either side of the → operator is of any supported type, and can be modified depending upon the type of operands. For example, a value of any type can be streamed to a value of type "stream". In this instance, the destination value is attached to, for example, a device such as a terminal or disk drive. A value of type "stream" can also be streamed into a value of any type. In this instance an external source is inputted, for example, into a program.

16 Claims, 16 Drawing Sheets

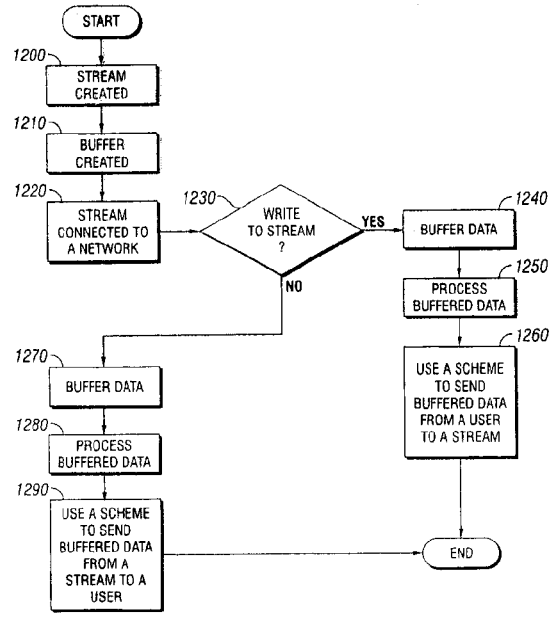

| Function | Purpose |
|---|---|
| openin (filename) | Open the named file for input |
| openout (filename) | Open the named file for output |
| openup (filename) | Open the names file for update(reading and writing) |
| openfd (fd) | Open the integer file descriptor as a stream |
| open (filename, mode) | Open the named file with the given integer mode. |

*FIG. 6A*

| Function | Meaning |
|---|---|
| Network.open (addr,port) | Open an active network connection (TCP) |
| Network.openServer (addr,port, type) | Open a passive network connection (TCP or UDP) |
| Network.lookupName (name) | Consult a naming service to convert a network name to an address |
| Network.lookupAddress (ipaddr) | Consult a naming service to convert an integer IP address into a host name |
| Network.accept () | Wait for and accept an incoming connection |
| Network.openSocket () | Open a UDP client socket for sending datagrams |
| Network.send (socket, addr, port, buffer) | Send a UDP datagram to the given socket. The addr and port specify the recipient. The buffer is the string to send |
| Network.receive (socket, var addr, var port, maxbuffer = 4096) | Wait for an incoming UDP datagram. Blocks until a datagram is received, then returns the data as a string. Also sets the addr and port to the sending address. The maxbuffer argument specifies the max size of data that can be received |
| Network.peek (socket, var addr, var port, maxbuffer = 4096) | As receive, but don't extract the data from the network. A call to receiver() will read the data. |
| Network.formatIPAddress (addr) | Build a string of the form n.n.n.n out of an integer IP address. |

*FIG. 6B*

| Data type | Reading | Writing |
|---|---|---|
| integer | Decimal integer converted to binary | Decimal interger |
| string | Whole line read - terminated by line feed character which is discarded | Characters written to stream |
| real | ASCII for real value | Written as ASCII |
| char | Single character | Single character |
| vector | Each line of file appended to vector - line feed is retained | Each element written |
| map | cannot read | Elements written as first = second |
| enumeration constant | cannot read | Name of enumeration constant |

*FIG. 7*

| Operation | Result |
|---|---|
| close (stream) | The stream is closed. |
| select (stream, timeout) | Returns 1 if there is data waiting to be read from stream. Times out after timeout microseconds. |
| eof (stream) | Returns 1 if the stream is at the end of file. |
| flush (stream) | Flush the data remaining in the stream buffers. |
| getchar (stream) | Read a single character from the stream. Returns the character read. |
| getbuffer (stream) | Read all the available characters in the stream buffer. Returns a string containing all the characters. |
| availableChars (stream) | Returns the number of characters in the buffer. |
| setStreamAttribute (stream, attr, value) | Set the value of a stream attribute. |
| rewind (stream) | Rewind the stream to the start. |
| seek (stream, offset, whence) | Move to a new position in a seekable stream. |

*FIG. 8*

| Output type | Input type | Operation |
|---|---|---|
| Integer | integer | copy left to right |
| | real | real converted to integer |
| | string | string converted to integer if possible, 0 otherwise |
| | vector | first element converted to integer |
| | map | first element converted to integer |
| | char | converted to integer |
| | block | integer set to address |
| | enumconst | index into enumeration |
| | object | call toInteger( ) if present, otherwise address of object |
| | stream | one integer read from stream |
| real | integer | converted to real |
| | real | copied |
| | string | string converted to real if possible, 0.0 otherwise |
| | vector | first element converted to real |
| | map | first element converted to real |
| | char | converted to integer then real |
| | block | converted to integer then real |
| | enumconst | converted to integer then real |
| | object | toReal( ) called if present, error otherwise |
| | stream | one floating point number read from stream |
| string | integer | converted to string |
| | real | converted to string |
| | string | copied |
| | vector | each element appended to string |
| | map | each element appended to string |
| | char | converted to string |
| | block | name of block |
| | enumconst | name of constant |
| | object | toString( ) called if present, blockname@address if not |
| | stream | one line read from stream |
| char | integer | truncated to 8 bits |
| | real | runtime error |
| | string | first character in string |
| | vector | first element converted to char |
| | map | first element converted to char |
| | block | first character of name |
| | enumconst | 'A' = first const, 'B' = second, etc |
| | object | toChar( ) called if present, error if not |
| | stream | one char read from stream |

*FIG. 9A*

| Output type | Input type | Operation |
|---|---|---|
| vector | object | toVector( ) called if present, otherwise object appended to vector |
| | anything | appended to vector |
| map | object | toMap( ) called if present, otherwise appended |
| | anything | appended as {x =x} |
| function | scalar | function called with single argument |
| | vector | function called once for each element. Element passed as parameter |
| | map | Function called for each element. Function has to arguments for left and right of map pair. |
| | stream | function called for each line of input |
| thread | | like function |
| class | | like function only new object created for each |
| package | | like class |
| enum | | runtime error |
| enumconst | | runtime error |
| object | | runtime error |
| stream | integer | converted to decimal character sequence |
| | real | converted to floating point character sequence |
| | string | each character written |
| | char | single character written |
| | vector | each element written |
| | map | each element written as left = right |
| | block | block name written |
| | enumconst | name of constant written |
| | object | "object" + address written |
| | stream | stream copied |

*FIG. 9B*